United States Patent
Duan et al.

(10) Patent No.: US 9,593,990 B2
(45) Date of Patent: Mar. 14, 2017

(54) STRESS MONITORING DEVICE OF ELASTO-MAGNETO-ELECTRIC (EME) EFFECT TYPE

(71) Applicant: ZHEJIANG UNIVERSITY, Hangzhou (CN)

(72) Inventors: Yuanfeng Duan, Hangzhou (CN); Siuwing Or, Hangzhou (CN); Ru Zhang, Hangzhou (CN); Keqing Fan, Hangzhou (CN); Yang Zhao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 67 days.

(21) Appl. No.: 14/291,315

(22) Filed: May 30, 2014

(65) Prior Publication Data

US 2014/0298916 A1  Oct. 9, 2014

Related U.S. Application Data

(63) Continuation-in-part of application No. PCT/CN2012/085367, filed on Nov. 27, 2012.

(30) Foreign Application Priority Data

Nov. 30, 2011 (CN) .......................... 2011 1 0389375

(51) Int. Cl.
*G01N 19/08* (2006.01)
*G01L 1/12* (2006.01)
(Continued)

(52) U.S. Cl.
CPC ................ *G01L 1/12* (2013.01); *G01L 1/125* (2013.01); *G01L 3/102* (2013.01); *G01L 3/104* (2013.01); *G01L 5/10* (2013.01); *G01M 5/0025* (2013.01)

(58) Field of Classification Search
CPC ... G01L 1/12; G01L 5/10; G01L 1/125; G01L 3/104; G01L 3/102; G01L 5/102; G01L 3/00; G01M 5/0025; G01R 33/18
(Continued)

(56) References Cited

U.S. PATENT DOCUMENTS

| 4,907,462 A * | 3/1990 | Obama et al. ............ G01L 3/10 |
| | | 73/862.36 |
| 2007/0051188 A1* | 3/2007 | Kwun ..................... G01L 3/105 |
| | | 73/862.331 |

FOREIGN PATENT DOCUMENTS

| CN | 201503413 | * | 6/2010 | ............. G01N 27/82 |
| CN | 102175359 | * | 9/2011 | ............... G10L 1/14 |

OTHER PUBLICATIONS

B. Hwa Kim et al, Estimation of cable tension force using the frequency-based system identification method, Journal of Sound and Vibration, 2007, pp. 660-676, vol. 304, issues 3-5, Elsevier, United States.

(Continued)

*Primary Examiner* — Harshad R Patel
*Assistant Examiner* — Brandi Hopkins
(74) *Attorney, Agent, or Firm* — Matthias Scholl, PC; Matthias Scholl

(57) ABSTRACT

A stress monitoring device of elasto-magneto-electric (EME) effect type, for monitoring stress of a structural component of ferromagnetic materials, includes a magnetic field generating unit, a magneto-electric (ME) sensing unit, a support skeleton, and a signal controlling and conditioning instrument. Under the control of the signal controlling and conditioning instrument, the magnetic field generating unit generates a magnetic field for magnetizing the structural component. The ME sensing unit outputs an electrical signal $V_{ME}$ characterizing the magnetic field without a need of external power supply. This electrical signal $V_{ME}$ is analyzed (Continued)

and processed by the signal controlling and conditioning instrument to output a magnetic characteristic value $V_{st}$ corresponding to the changes of the external forces that are exerted on the component. This stress monitoring device realizes on-line, real-time, and nondestructive monitoring, as well as off-line nondestructive monitoring.

9 Claims, 26 Drawing Sheets

(51) Int. Cl.
    *G01M 5/00*     (2006.01)
    *G01L 3/10*     (2006.01)
    *G01L 5/10*     (2006.01)

(58) Field of Classification Search
    USPC .............................. 73/862.233, 779; 324/209
    See application file for complete search history.

(56) References Cited

OTHER PUBLICATIONS

K. N. Bhat, Silicon micromachined pressure sensors, Journal of the Indian Institute of Science, 2007, pp. 115-131, vol. 87:1, IISc Press, India.

J. W. Wheeler et al, MEMS-based bubble pressure sensor for prosthetic socket interface pressure measurement, Conf Proc IEEE Eng Med Biol Soc., 2011, pp. 2925-2928, vol. 2011, IEEE Service Center, United States.

L. H. Dong et al, Metal magnetic memory testing for early damage assessment in ferromagnetic materials, Journal of Central South University of Technology, 2005, pp. 102-106, vol. 12, supple 2, Central South University, China.

P. Dong et al, Effect of stress gradients in the surface layer of beryllium on X-ray stress measurement, Materials Characterization, 2003, pp. 381-386, vol. 49, Elsevier, United States.

D. S. Li et al, Strain transferring analysis of fiber Bragg grating sensors, Optical Engineering, 2006, pp. 324402-1-024402-8, vol. 45, No. 2, Society of Photo-Optical Instrumentation Engineers, United States.

G. R. Higson, Recent advances in strain gauges, Journal of Scientific Instruments, 1964, pp. 405-414, vol. 41, No. 7, IOP Publishing, United Kingdom.

M W Gall, Early days of the resistance strain gauge, Strain, 1989, pp. 83-88, vol. 25, Wiley-Blackwell Publishing, United Kingdom.

S. Sumitro et al, Monitoring based maintenance utilizing actual stress sensory technology, Smart Materials and Structures, 2005, pp. S68-S78, vol. 14, IOP Publishing Ltd, United Kingdom.

B. Kvasnica et al, Highly precise non-contact instrumentation for magnetic measurement of mechanical stress in low-carbon steel wires, Measurement Science & Technology, 1996, pp. 763-767, vol. 7, IOP Publishing, United Kingdom.

* cited by examiner

STRESS MONITORING DEVICE OF ELASTO-MAGNETO-ELECTRIC (EME) EFFECT TYPE

CROSS-REFERENCE TO RELATED APPLICATIONS

This application is a continuation-in-part of International Patent Application No. PCT/CN2012/085367 with an international filing date of Nov. 27, 2012, designating the United States, now pending, and further claims priority benefits to Chinese Patent Application No. 201110389375.8 filed Nov. 30, 2011. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

Field of the Invention

The present invention relates to a stress monitoring device of elasto-magneto-electric (EME) effect type, and specifically to a non-destructive stress monitoring device for structural components of ferromagnetic materials.

Background of the Invention

Several stress monitoring instruments are presently available, such as the pressure sensor, the resistance strain sensor, the vibrating wire strain sensor, the optical fiber grating strain sensor, the piezoelectric acceleration sensor for measuring vibration frequency, and the Elasto-Magnetic cable force sensor based on elasto-magnetic effect. Measuring cable force by applying the pressure sensor is realized by using the precise pressure gauge or hydraulic sensor to measure the hydraulic pressure of the oil cylinder when the cable is stretched by the lifting jack. However, due to the characteristics of the pressure gauge, including the instability in the indicator reading, the necessity to convert the reading to the load value, and large influence by human factor, the pressure sensor is unavailable in the dynamic stress monitoring for the in-service structures. Measuring cable force by applying the resistance strain sensor is based on the principle that the wire resistance varies as the length of the wire changes. Measuring cable force by applying the vibrating wire strain sensor is based on the principle that the vibration frequency of the tensioned metallic string varies as the force resulted from the relative displacement of fixed ends of the string changes. Measuring cable force by applying the optical fiber grating strain sensor is based on the principle that the wavelength of light-wave passing through the optical grating varies with deformation of the optical fiber. In the above mentioned three methods for measuring cable force, the three strain sensors must be sticked on the surface of the structural component, or be welded to the surface of the structural component through the supporting device, or embedded into deforming body. Therefore, when using the above mentioned three methods, the installation is inconvenient and the measurement results are susceptible to influences of external factors. For in-service structures, the resistance strain sensor, vibrating wire strain sensor, or optical fiber grating strain sensor can only measure the changes of the strain/stress (namely, the increment) relative to initial strain/stress after installation or zero setting, but cannot measure the actual absolute value of the strain/stress. Monitoring cable force by measuring vibration frequency uses the quantitative relationship between the cable force and the vibration frequency to convert the vibration frequency tested by the acceleration sensor to the cable force. Because it is simple, cost-saving, and available in online monitoring in-service structures, the method of monitoring cable force by measuring vibration frequency is widely applied in practical engineering. However, there are disadvantages for the method of monitoring cable force by measuring vibration frequency: (1) the relationship between the cable force and the vibration frequency is affected by flexural rigidity, slope, sag, boundary conditions, and the vibration reducing and damping device of the cable, which causes errors in the conversion of the cable force; (2) the converted cable force is static value or averaged value, correspondingly, it is impossible to obtain the variations of the cable force in periodic vibration; and (3) the method is not suitable for monitoring stress of the structural components other than cable.

Measuring cable force by applying the Elasto-Magnetic force sensor based on the Elasto-Magnetic effect implements the principle that the magnetization characteristic changes when the ferromagnetic component placed in the magnetic field suffers the stress, and derives the cable force of calibrated ferromagnetic components. Since the method of using Elasto-Magnetic sensor to monitor cable force has advantages in monitoring the actual stress of the in-service structures and realizing non-destructive monitoring, the method overcomes the disadvantages of the other above mentioned methods and thus is a promising method in monitoring stress of the in-service steel structures. At present, there are mainly two types of such Elasto-Magnetic force sensor, namely, the sleeve-type sensor and the bypass-type sensor. On one hand, when used for monitoring stress of the in-service structures, the sleeve-type sensor needs in-situ winding coils, which leads to inconvenient time-consuming operation and heavy workload. Furthermore, because it is hard to control the quality of the coils of the sleeve-type sensor, the accuracy in measurement is low. On the other hand, the utilization of the bypass-type sensor is still in the stage of exploration and has not been promoted to engineering application because of the shortcomings due to the conduction yoke, including large size, heavy weight, and high production cost. No matter the sleeve-type or the bypass-type, the existent Elasto-Magnetic sensors use the secondary coil as the signal detecting element, which results in long measurement cycle (at least 10 seconds for each measurement). Therefore, the existent Elasto-Magnetic sensors cannot realize real-time monitoring and cannot monitor stress variations of the structure in the vibration process (under the action of seismic or/and strong winds). In addition, when using the existent Elasto-Magnetic sensors, it is demanded that the drive coil is large or the magnetic current is high in order to produce strong enough magnetic field, or that the turns of the secondary coil in a winding of a certain length are increased so that the secondary coil could generate sensitive-enough signals to increase the signal-to-noise ratio of the signals for monitoring stress. Furthermore, since the secondary coil is usually wound around the cylindrical support skeletons, the existent Elasto-Magnetic sensors merely detects magnetic field inside the coil, and thus the measured force is the average force of the structural component inside the coil. Hence, the current Elasto-Magnetic sensor could merely measure the uniaxial loads exerted on the components, mainly the cable force, which limits the application of the current Elasto-Magnetic sensor in the components of non-cylindrical cross-section or under complicated loadings.

As illustrated in FIG. 1, the conventional Elasto-Magnetic stress monitoring device generally comprises an excitation coil, a secondary coil, a support skeleton, a drive circuit, an integrator, a data acquisition and processing module, and a controlling instrument (such as a computer). The support skeleton is installed around the monitored structural component, and the excitation coil and the secondary coil are wound on the support skeleton. When the excitation coil is charged with electricity, a magnetic field is generated to magnetize the structural component to a nearly saturated state. Then, during the demagnetization phase, the magnetic flux passing through the secondary coil is changed and thus the secondary coil output an induced signal. And then, the induced signal is integrated to obtain a detectable electric signal. After data analysis and processing for the detectable electric signal, a characteristic value related to the permeability of the monitored structural component is achieved. Because the permeability of the monitored structural component is related to the stress state, the characteristic value can be converted to the stress using the beforehand calibrated data in the laboratory or on the site where the structural component is installed.

Several references in the art recite the Elasto-Magnetic stress monitoring device of FIG. 1, including CN 201242481Y, CN 101334325A, CN 101051226A, CN 101013056A, CN 24276011Y.

SUMMARY OF THE INVENTION

In view of the above described problems, it is one objective of the invention to provide a stress monitoring device having high frequency of sampling to achieve real-time on-line dynamic monitoring and being applicable in monitoring total stress of steel components or other ferromagnetic components in different stress states or of various cross-sectional shapes.

To achieve the above objective, the present invention provides a stress monitoring device of elasto-magneto-electric (EME) effect type.

According to one aspect of the present invention, there is provided a stress monitoring device of EME effect type for monitoring stress of a structural component of ferromagnetic material, comprising: a magnetic field generating unit, one or more magneto-electric (ME) sensing units, one or more support skeletons, and a signal controlling and conditioning instrument. The magnetic field generating unit is controlled by the signal controlling and conditioning instrument to generate magnetic field in the detected area around the structural component to magnetize the structural component. The ME sensing unit is made of ME laminated composite. Furthermore, the ME sensing unit directly produces an electrical signal $V_{ME}$ to characterize the magnetic field intensity and magnetic induction intensity without external power supply and signal integration. The support skeleton is used to set up the magnetic field generating unit and fix the ME sensing unit. The signal controlling and conditioning instrument controls the magnetic field generating unit to generate the needed magnetic field, receives the electrical signal $V_{ME}$ sent from the ME sensing unit, and outputs the final signal $V_{st}$ after signal conditioning, wherein the final signal $V_{st}$ is a magnetic characteristic value corresponding to the stress of the structural component.

In a class of the embodiment, the magnetic field generating unit is chosen from: (a) excitation coils which generates magnetic field by the excitation electric current provided by a drive circuit; (b) permanent magnets; and (c) the combination of the excitation coils and the permanent magnets. The number of the excitation coils or permanent magnets is one or more connected in series or parallel.

In a class of the embodiment, the one or more ME sensing units are arranged on the support skeletons or on the surface of the structural component, at the positions corresponding to one or more detected cross-sections of the structural component.

In a class of the embodiment, according to the magnetic field distribution in the detected structural component and the adjacent areas, the ME sensing unit is arranged either on the support skeleton or on the surface of the structural component, at the position where the magnetic field is most sensitive to the stress.

In a class of the embodiment, the ME sensing unit is arranged inside or outside of the support skeleton, wherein the outside of the support skeleton includes inner or outer surfaces of the support skeletons, or the surface of the structural component.

In a class of the embodiment, the support skeleton is a unitary body or an assembled body of several pieces.

In a class of the embodiment, the signal controlling and conditioning instrument comprises a drive circuit and a data acquisition and processing device to control the magnetic field generating unit and collecting and processing data of the electrical signal $V_{ME}$ sent from ME sensing unit to obtain the magnetic characteristic value $V_{st}$ which is corresponding to the stress of the structural component.

In a class of the embodiment, the source signal of the excitation coils is an AC signal or a pulse signal.

In a class of the embodiment, the magnetic field generating unit, the ME sensing unit, the support skeleton unit, the signal controlling and conditioning instrument, or parts thereof, or the entire monitoring device is installed with a protection cover. The protection cover not only shields the external magnetic field to reduce interference with the internal magnetic field and signals, but also protects the entire monitoring device from external damage to prolong the service life of the device.

The stress monitoring device of the present invention uses ME sensing unit to replace the signal-integration-required secondary coil as the signal detecting element. The ME sensing unit is made of ME laminated composite, and correspondingly the ME sensing unit is able to monitor real-time changes in magnetic field intensity (the response time for the monitoring is in order of milliseconds). The size of the ME sensing unit is small, and correspondingly the weight and size of the device is effectively reduced. The ME sensing unit does not require power supply. The required excitation magnetic intensity is highly reduced due to the high sensitivity of the said ME sensing unit, which effectively reduces the weight and occupation volume of the excitation coil or other type of magnetic field generating unit. By implementing the ME sensing units in different arrangements, monitoring stress of the component in different stress states or of various cross-sectional shapes is realized. The device of the present invention is of high signal sensitivity, high stability and repeatability in testing data, and high measurement precision. Collecting data and processing data in the device of the present invention is automatic so that it is easy to observe stress changes of the measured structural component to realize the automation and continuity of measurement. The application range of the device of the present invention is wide. The installation of the device of the present invention is convenient, and the calibration of the device is simple.

DETAILED DESCRIPTION OF THE EMBODIMENTS

Figure 1:
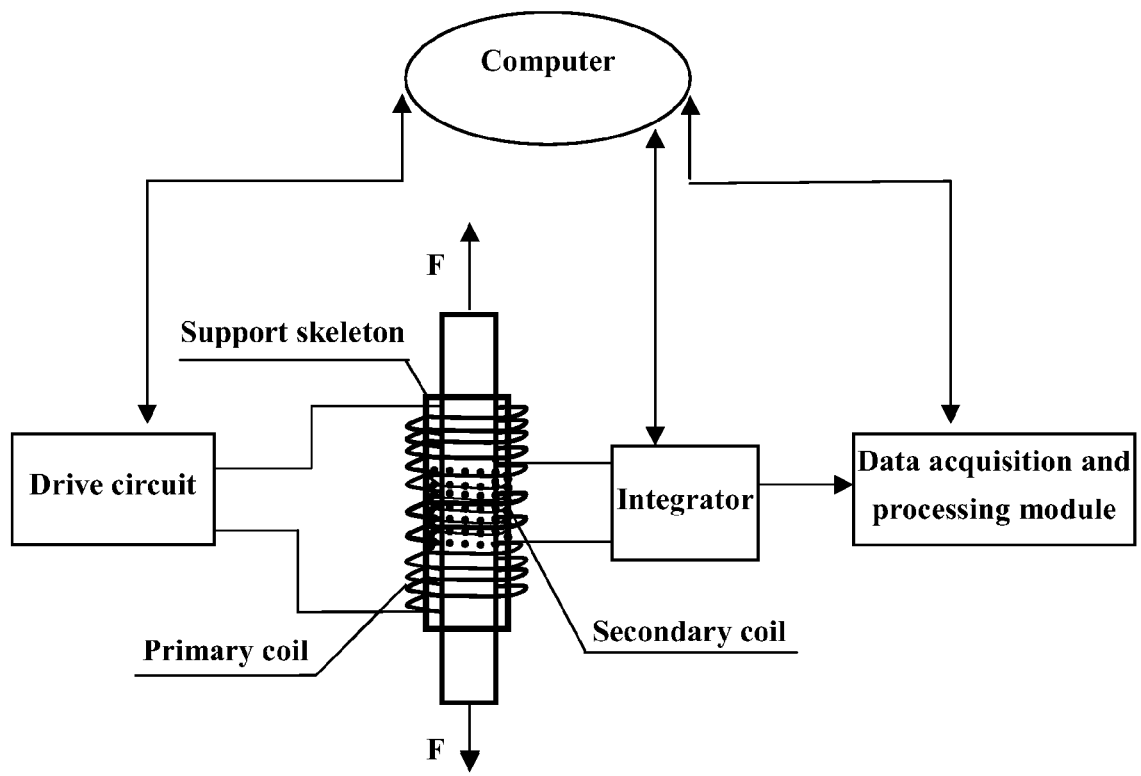
FIG. 1 is a functional diagram of the conventional stress monitoring device comprising Elasto-Magnetic cable force sensor.
Figure 2:
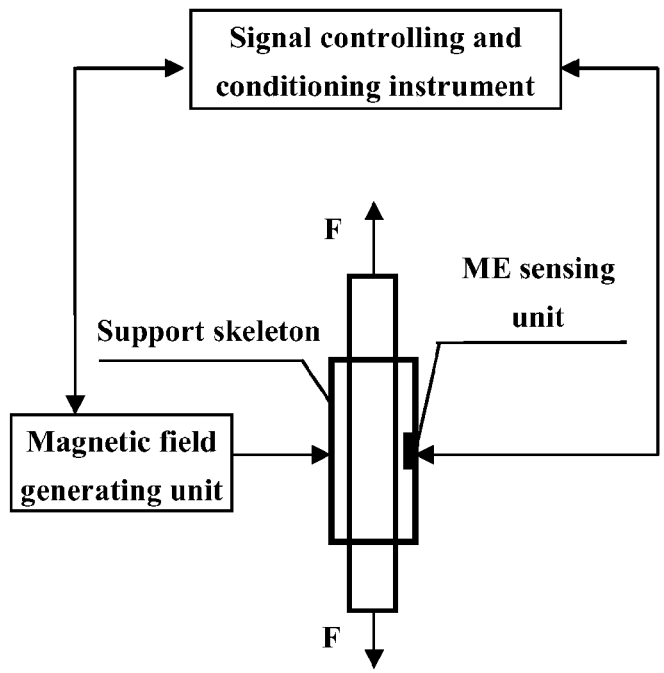
FIG. 2 is a functional diagram of a stress monitoring device of elasto-magneto-electric (EME) effect type in accordance with one embodiment of the invention.

FIG. 2 illustrates an exemplary embodiment of a stress monitoring device of EME effect type of the present invention. The stress monitoring device of the present invention comprises a magnetic field generating unit, one or more ME sensing units, one or more support skeletons, and a signal controlling and conditioning instrument. In this invention, the ME sensing units are used to replace the secondary coil of the conventional Magneto-Elastic cable force sensor shown in FIG. 1 to generate sensing signals. The ME sensing units possess the following advantages: 1) being capable of producing a strong output signal in proportional to the external force (i.e., good linearity in the mechanical-magneto-electric coupling); 2) being sensitive to the variances of the external force; and 3) being installed easily and stably.

In the present invention, under the control of signal controlling and conditioning instrument, the magnetic field generating unit creates a magnetic field in the area where the ME sensing units are applied. The ferromagnetic structural component is thus magnetized. Under the action of the external forces, the magnetic properties of the component are changed, which causes changes in the magnetic intensity and induction intensity in the position of the component and the neighboring area. The magnetic field generating unit is of various kinds in need thereof. The ME sensing unit used to monitor the changes of the magnetic intensity and induction intensity directly generates an electrical signal $V_{ME}$ characterizing the magnetic intensity or induction intensity without the process of signal integration. The electrical signal $V_{ME}$ is analyzed and processed by the signal controlling and conditioning instrument to output a final signal, namely, the magnetic characteristic value $V_{st}$ which is corresponding to the stress state of the component. Therefore, nondestructive monitoring stress and external force of a structural component of a ferromagnetic material is realized by using the monitoring device of the present invention.

Figure 3A:
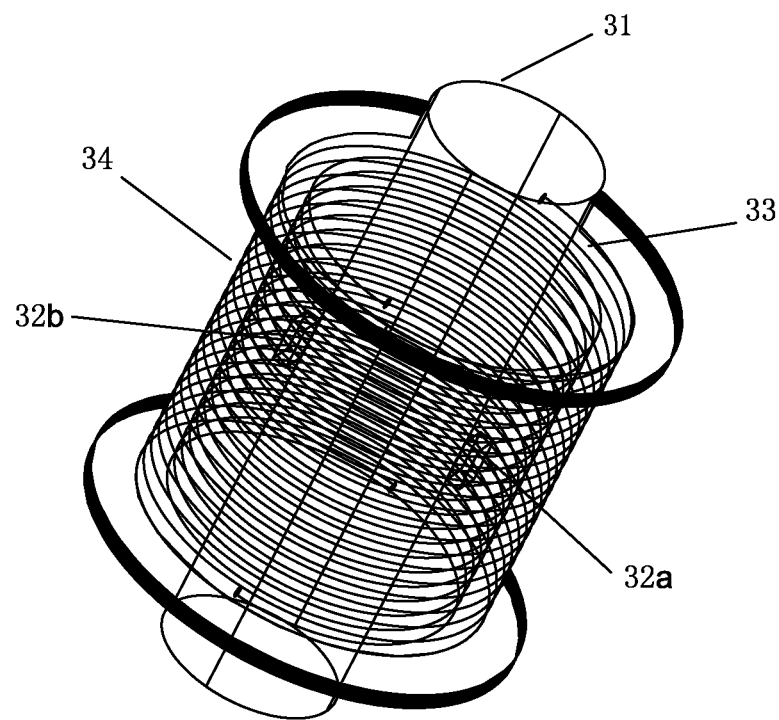
FIG. 3A is an overall diagram for an exemplary structure of the device of FIG. 2 comprising an exciting coil as the magnetic field generating unit in accordance with one embodiment of the invention.
Figure 3B:
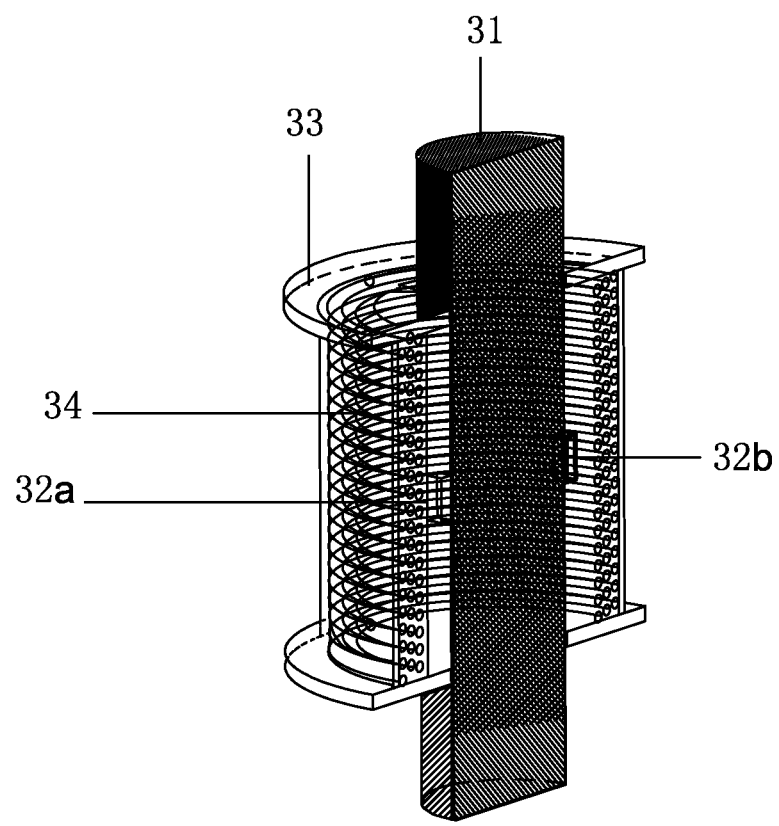
FIG. 3B is the longitudinal sectional diagram for an exemplary structure of the device of FIG. 2 comprising an exciting coil as the magnetic field generating unit in accordance with one embodiment of the invention.
Figure 3C:
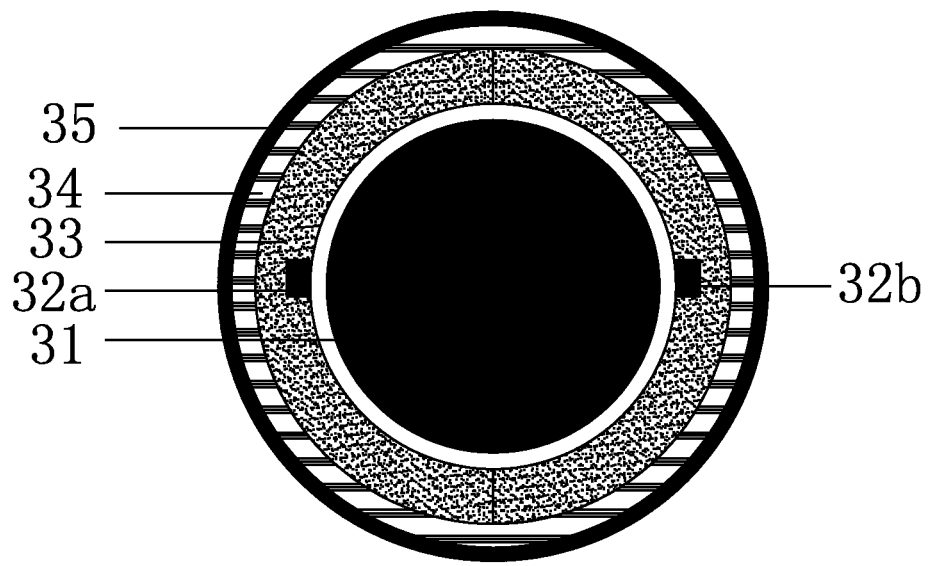
FIG. 3C is the transversal sectional diagram for an exemplary structure of the device of FIG. 2 comprising an exciting coil as the magnetic field generating unit in accordance with one embodiment of the invention.

FIGS. 3A, 3B, and 3C are respectively the overall schematic diagram, longitudinal sectional diagram, and cross-sectional diagram for a first exemplary structure of a stress monitoring device of EME effect type of FIG. 2. The magnetic field generating unit is an exciting coil 34. A support skeleton 33 is installed outside the ferromagnetic component 31, the exciting coil 34 is wound around the support skeleton, and two ME sensing units 32a and 32b are placed inside of the support skeleton 33.

The number of the ME sensing unit may be one or more; the ME sensing unit may be installed interior or exterior of the support skeleton; the support skeleton may be an integral body or an assembled body of more than pieces for the purposes of convenient production process and installation process; the exciting coil may be one coil or more coils connected in series or parallel; and the signal source of the exciting coil may be an AC signal or pulse signal.

Figure 4A:
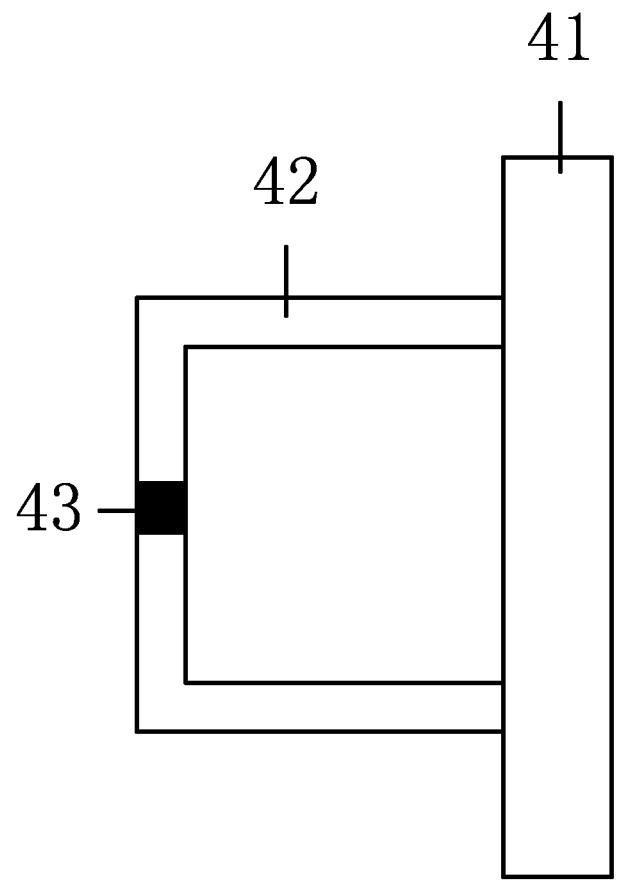
FIG. 4A is the longitudinal sectional diagram for an exemplary structure of the device of FIG. 2 comprising a single permanent magnet as the magnetic field generating unit in accordance with one embodiment of the invention.
Figure 4B:
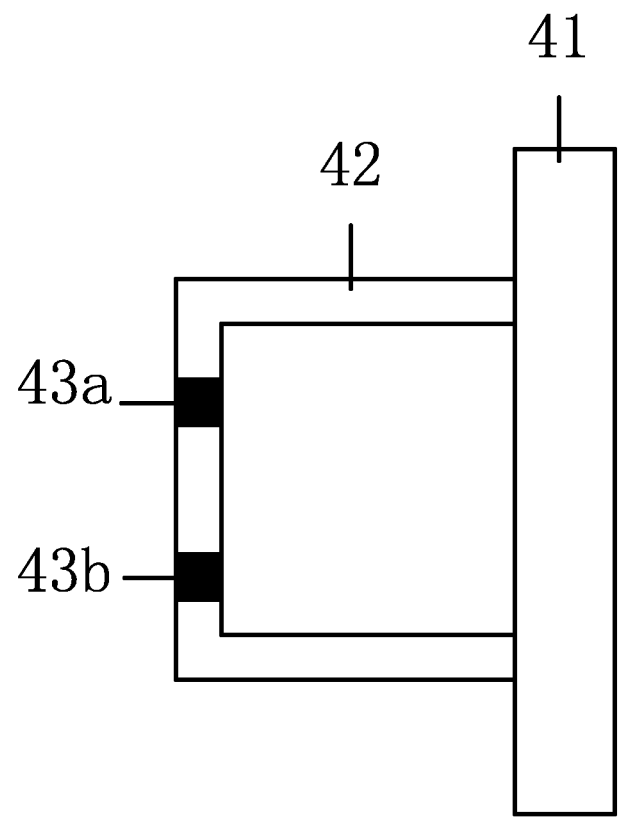
FIG. 4B is the longitudinal sectional diagram for an exemplary structure of the device of FIG. 2 comprising two permanent magnets as the magnetic field generating unit in accordance with one embodiment of the invention.
Figure 4C:
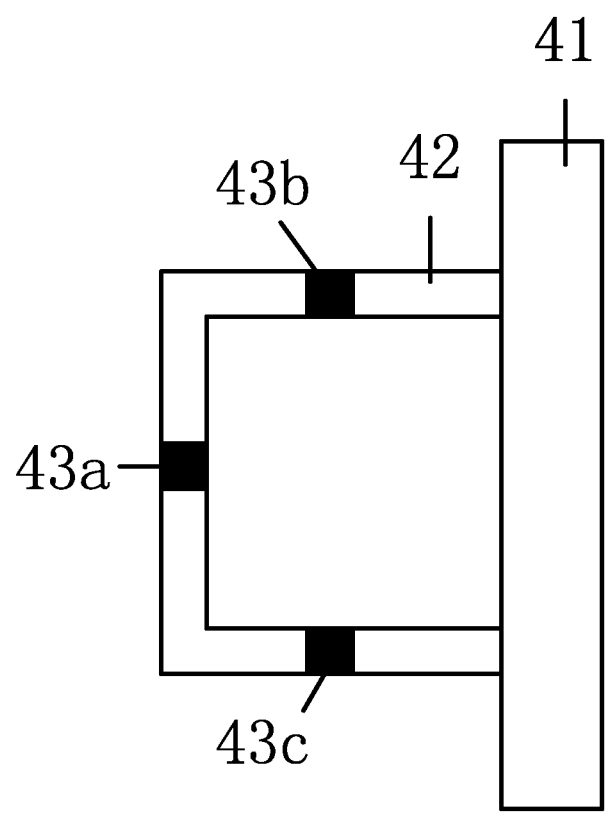
FIG. 4C is the longitudinal sectional diagram for an exemplary structure of the device of FIG. 2 comprising three permanent magnets as the magnetic field generating unit in accordance with one embodiment of the invention.

FIGS. 4A, 4B, and 4C are longitudinal sectional diagrams for a second exemplary structure of the stress monitoring device of FIG. 2. The magnetic field generating unit is a permanent magnet 43 which forms a magnetic field loop together with the monitored component 41 via a yoke 42. The number of the permanent magnet 43 may be one (43, see FIG. 4A), two (43a, 43b, see FIG. 4B), three (43a, 43b, 43c, see FIG. 4C), or more.

Figure 5A:
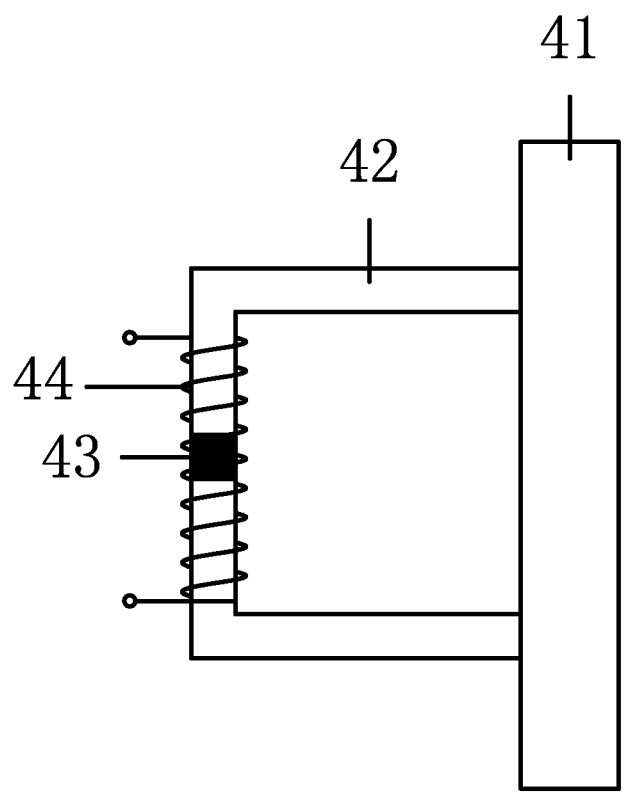
FIG. 5A is the longitudinal sectional diagram for an exemplary structure of the device of FIG. 2 comprising a combination of an exciting coil and a permanent magnet as the magnetic field generating unit in accordance with one embodiment of the invention.
Figure 5B:
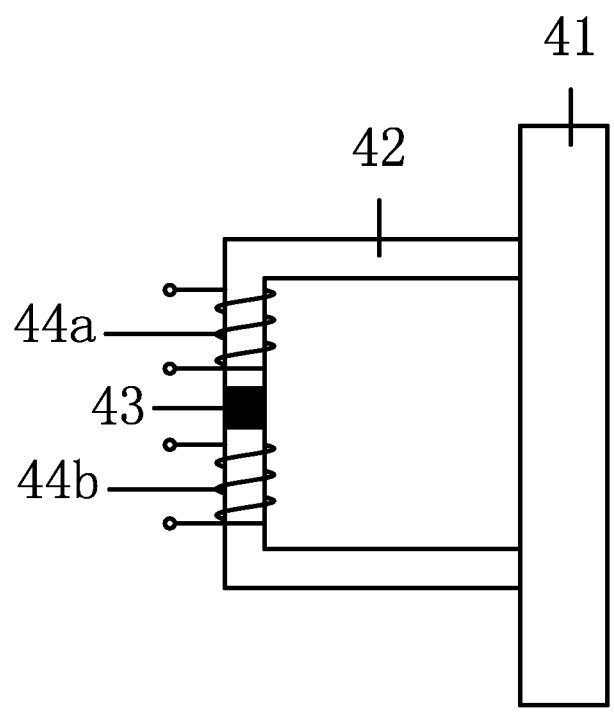
FIG. 5B is the longitudinal sectional diagram for an exemplary structure of the device of FIG. 2 comprising a combination of two exciting coils and a permanent magnet as the magnetic field generating unit in accordance with one embodiment of the invention.
Figure 5C:
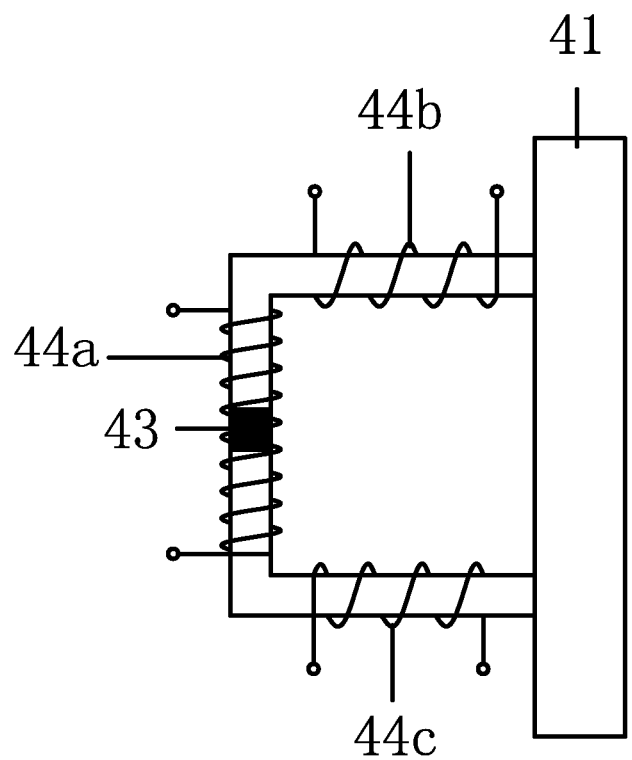
FIG. 5C is the longitudinal sectional diagram for an exemplary structure of the device of FIG. 2 comprising a combination of three exciting coils and a permanent magnet as the magnetic field generating unit in accordance with one embodiment of the invention.

FIGS. 5A, 5B, and 5C are longitudinal sectional diagrams for a third exemplary structure of the stress monitoring device of FIG. 2. The magnetic field generating unit is the combination of an exciting coil 44 and a permanent magnet 43. The exciting coil 44 may include one coil (44, see FIG. 5A), two coils (44a, 44b, see FIG. 5B), three coils (44a, 44b, 44c, see FIG. 5C), or more coils connected in series or parallel; and the signal source of the exciting coil 44 may be an ac signal or pulse signal. Although the number of the permanent magnet 43 shown in FIGS. 5A, 5B, and 5C is one, it may be one, two, or more as shown in FIGS. 4A, 4B, and 4C.

Figure 6A:
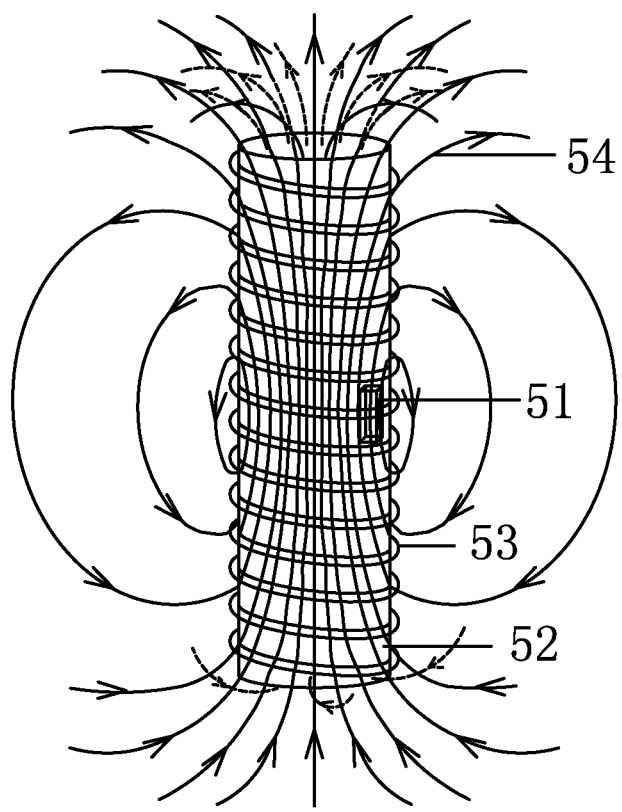
FIG. 6A is a schematic perspective diagram illustrating distribution of the magnetic flux lines and a longitudinal arrangement of the ME sensing units for an exemplary structure of the device of FIG. 3B which monitors a single cross section of a structural component, in accordance with one embodiment of the invention.
Figure 6B:
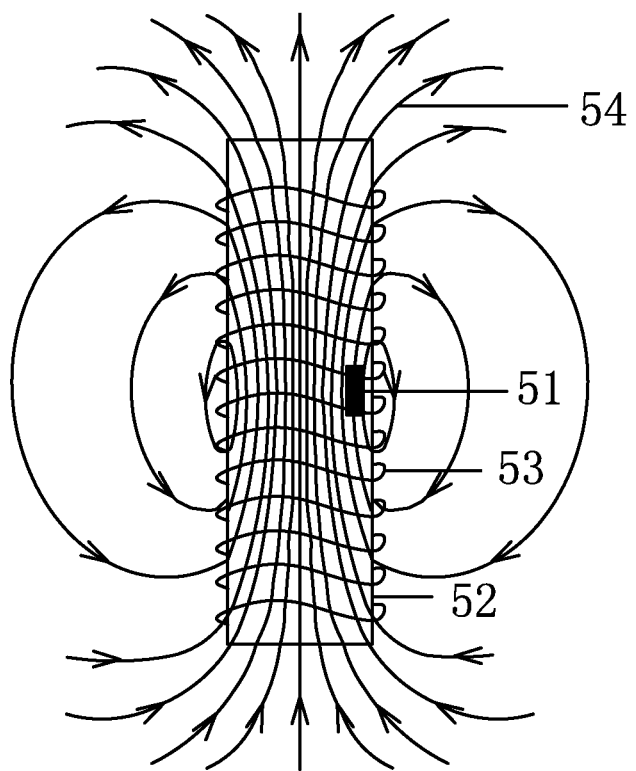
FIG. 6B is a front view of the structure of FIG. 6A.

FIGS. 6A and 6B are respectively a schematic perspective diagram and a front view for a first exemplary structure of the stress monitoring device of FIG. 3B. The structure of FIGS. 6A and 6B is used for monitoring a single cross section of a structural component. The ME sensing units are arranged according to the patterns of the forces applied to the component and the distribution of the magnetic flux lines around the component. The magnetic flux lines 54 and the axial arrangement of the ME sensing unit 51 are shown for the case that the component 52 is exerted a uniaxial loading. Preferably, the ME sensing unit 51 is arranged in the position where magnetic intensity is the most sensitive to stress change. For example, for an uniaxial loading component 51, according to the distribution of the magnetic flux lines 54 shown in these two figures, the ME sensing unit 51 is arranged in the position corresponding to the middle position of exciting coil 53 where the magnetic flux lines are the densest and the changes of the magnetic intensity are the largest when the stress changes. Nevertheless, the ME sensing unit 51 may be arranged in other places.

Figure 7A:
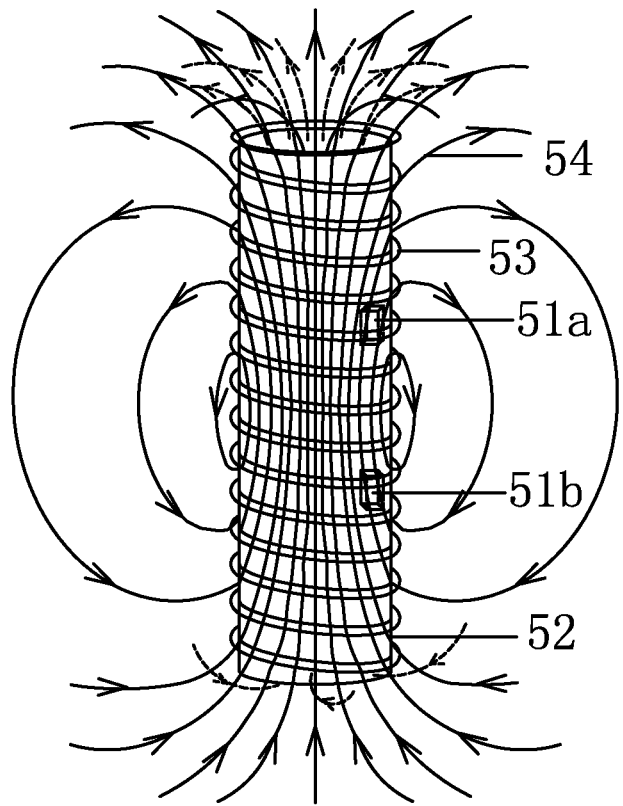
FIG. 7A is a schematic perspective diagram illustrating distribution of the magnetic flux lines and a longitudinal arrangement of the ME sensing units for an exemplary structure of the device of FIG. 3B which monitors multiple uniform cross sections of a structural component by displacing several rows of the ME sensing units in one magnetic coil (the arrangement for detection between the magnetic coils and the ME sensing units is a E-MultiME type arrangement), in accordance with one embodiment of the invention.
Figure 7B:
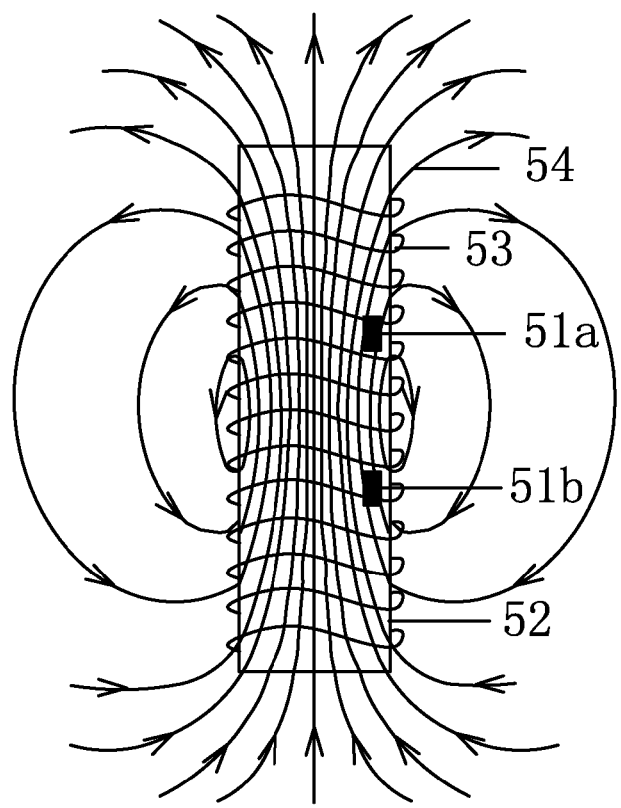
FIG. 7B is a front view of the structure of FIG. 7A.

FIGS. 7A and 7B respectively a schematic perspective diagram and a front view for a second exemplary structure of the stress monitoring device of FIG. 3B. The structure of FIGS. 7A and 7B is used for monitoring multiple cross sections of a structural component having uniform cross sections. For a structural component exerted axial forces similar to that of the component 52 in this embodiment, the ME sensing units are arranged in several cross sections as two ME sensing units 51a and 51b in this embodiment are arranged in two cross sections, to better monitor the stress state along the axis of the component in the direction where the forces are applied. When the component is applied with a axially constant force, the average value detected from the different ME sensing units in the different cross sections represents the stress of the component, which effectively improving the precision and reliability in measurement.

Figure 8:
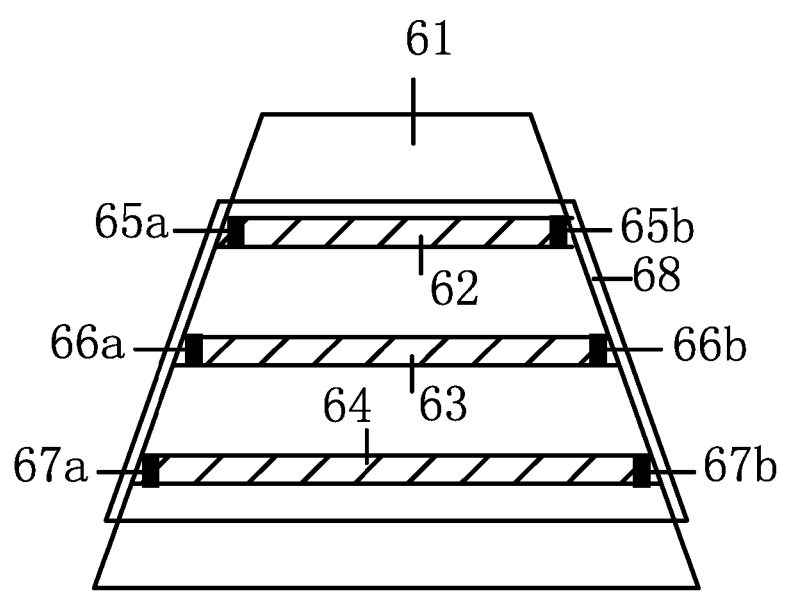
FIG. 8 is schematic diagram illustrating a longitudinal arrangement of the monitored cross sections and the ME sensing units for an exemplary structure of the device of FIG. 3B which monitors multiple non-uniform cross sections of a structural component by displacing several rows of the ME sensing units in one magnetic coil (a E-MultiME type detection arrangement), in accordance with one embodiment of the invention.

FIG. 8 is a schematic diagram illustrating a longitudinal arrangement of the monitored cross sections and the ME sensing units for a third exemplary structure of the stress monitoring device of FIG. 3B. The structure of FIG. 8 is used for monitoring multiple cross sections of a structural component having non-uniform cross sections. In this embodiment, three couples of ME sensing units (65a, 65b), (65a, 65b), and (65a, 65b) are respectively arranged on the cross sections 62, 63, and 64 to monitor stress, and the arrangement for detection between excitation coil and the ME sensing units is a E-MultiME type arrangement (i.e., several rows of the ME sensing units are arranged in one excitation coil). For a structural component comprising non-uniform cross sections or being exerted forces changed along the cross sections, detection of the forcing state of the component is achieved by monitoring multiple cross sections of the component, as is the case in this embodiment. Detecting forcing state of the component by monitoring multiple cross sections of the component of this embodiment has an advantage in the case when the component is exerted non-axial forces including bending force and torque.

Figure 9:
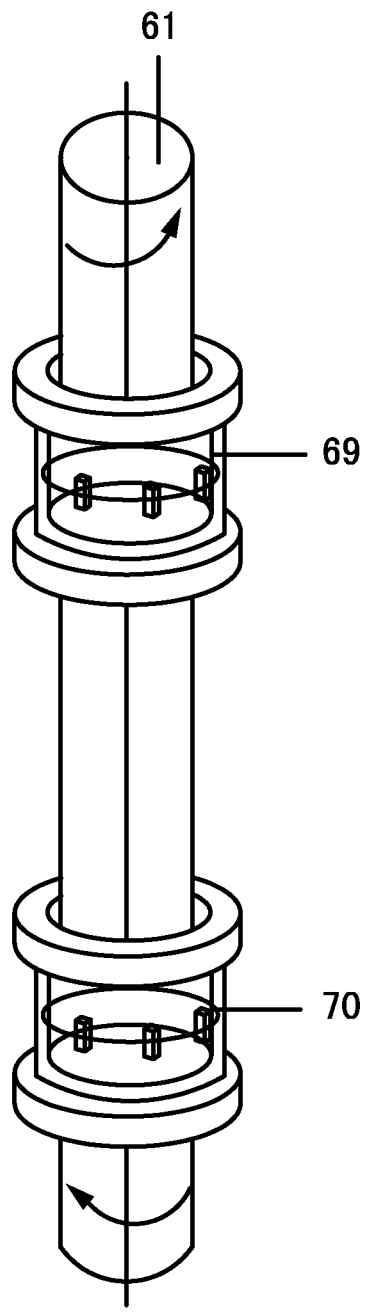
FIG. 9 is a schematic perspective diagram for an exemplary structure of the device of FIG. 3B which monitors multiple cross sections of a structural component by using several sets of the magnetic field generating units each combined with one or more ME sensing units (the arrangement for detection between the magnetic field generating units and the ME sensing units is a Multi-EME type arrangement), in accordance with one embodiment of the invention.

FIG. 9 is a schematic perspective diagram illustrating a longitudinal arrangement of the ME sensing units and the magnetic field generating units for a fourth exemplary structure of the device of FIG. 3B. The structure of FIG. 9 is used for monitoring multiple cross sections of a structural component by displacing several sets of the magnetic field generating units each combined with one or more ME sensing units on the multiple cross sections (a Multi-EME detection type). As shown in the figure, an individual set of the magnetic field generating unit combined with several ME sensing units (69, 70) is arranged on each of the different cross sections 61. Although FIG. 9 merely illustrates an example involving a structural component having uniform cross sections, the structural layout of the figure is applicable in the case where the detected structural component comprises non-uniform cross sections. For a structural component comprising non-uniform cross sections or being exerted forces changed along the cross sections, detection of the forcing state of the component is achieved by monitoring multiple cross sections of the component, as is the case in this embodiment. Detecting forcing state of the component by monitoring multiple cross sections of the component of this embodiment has an advantage in the case when the component is exerted non-axial forces including bending force and torque.

Due to its small size and light weight, the ME sensing unit occupies small space for location and accordingly is able to precisely detect local magnetic strength and induction strength to achieve local stress of the component. Therefore, the combination of the stresses in different locations of the component may provide a precise forcing state of the component of various forms when multiple ME sensing units are used to detect the different locations of the components. For example, for detecting a structural component under axial forces, one ME sensing unit may be used to output a value representing the stress, or multiple ME sensing units may be used to output a average value representing the stress to reduce measurement error due to the non-uniformity of the component. Before the elastic instability of the structural component occurs, i.e., when only axial forces are exerted on the component, the conventional elasto-magnetic cable force sensor is able to measure the uniaxial forcing state like the sensor comprising the ME sensing units of the present invention. However, once the elastic instability of the component occurs, i.e., when bending forces or toques are exerted on the component, the conventional elasto-magnetic cable force sensor cannot detect the forcing state changes due to the bending forces or torques, while the present sensor having multiple ME sensing units is able to do so.

The following exemplary embodiments illustrate that multiple ME sensing units are used to monitor stress of the structural components under different forcing states.

Figure 10A:
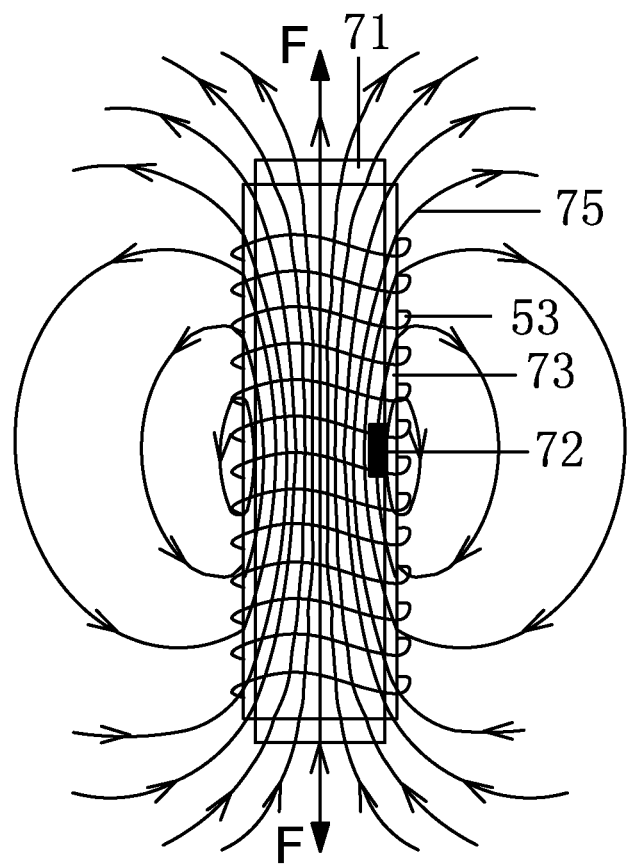
FIG. 10A is a longitudinal sectional diagram illustrating distribution of the magnetic flux lines, an arrangement of the ME sensing units, and an arrangement of the skeleton segmentations for an exemplary structure of the device of FIGS. 3A, 3B, and 3C which monitors stress of a structural component under a uniaxial load, in accordance with one embodiment of the invention.
Figure 10B:
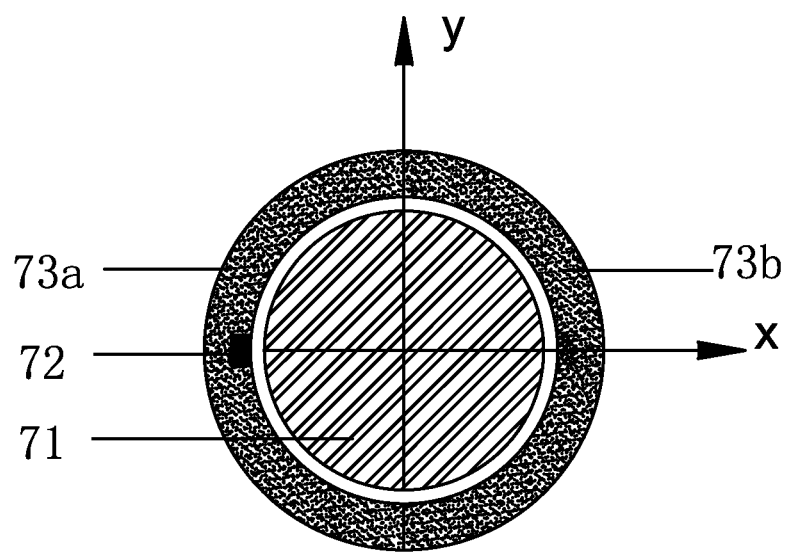
FIG. 10B is a transversal sectional diagram for the structure of FIG. 10A.

FIGS. 10A and 10B are respectively a longitudinal sectional diagram and a cross-sectional diagram for an exemplary structure of the device of FIGS. 3A, 3B, and 3C which monitors stress of a structural component under a uniaxial load. In this embodiment, the component 71 is subjected to an axial force F, a ME sensing unit 72 and two support skeleton segmentations 73 are used for detection. The distribution of the magnetic flux lines 75 and the arrangement of the ME sensing unit 72, as well as the partitioning form of support skeleton 73 are shown in the figure. Even though the shown support skeleton 73 is segmented into two pieces 73a, and 73b, the support skeleton 73 may be formed by one or more pieces according to the needs of actual manufacture and installation. The number of the ME sensing unit 72 may be one or more as needed.

Figure 11A:
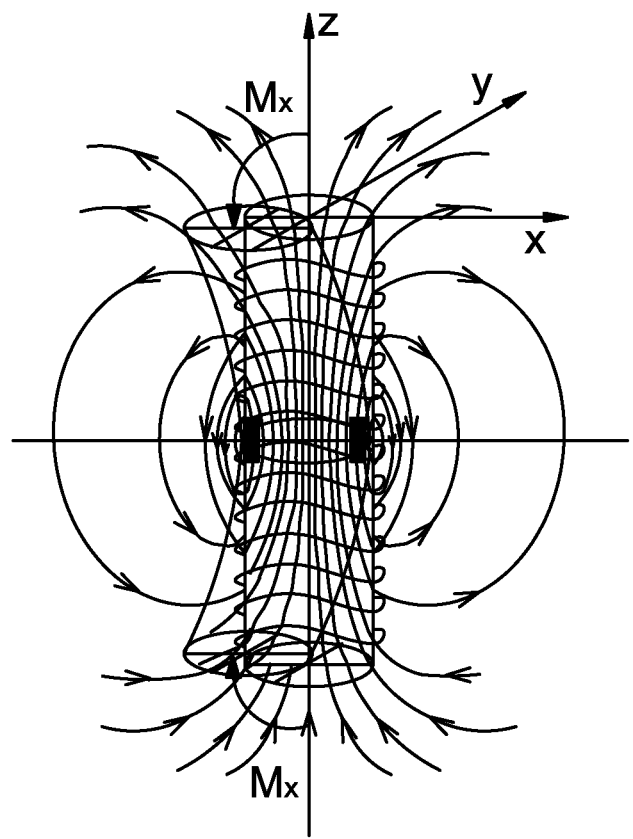
FIG. 11A is a schematic perspective diagram illustrating distribution of the magnetic flux lines, an arrangement of the ME sensing units, and an arrangement of the skeleton segmentations for an exemplary structure of the device of FIGS. 3A, 3B, and 3C which monitors stress of a structural component under a one-way bending load $M_x$ around the X axis, in accordance with one embodiment of the invention.
Figure 11B:
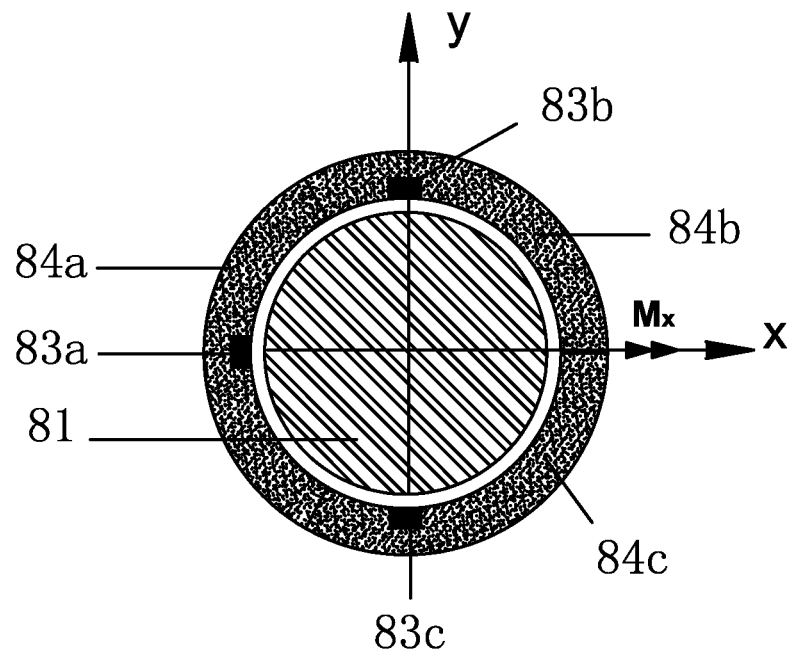
FIG. 11B is a transversal sectional diagram for the structure of FIG. 11A which monitors stress of a structural component under a one-way bending load $M_x$ around the X axis.
Figure 11C:
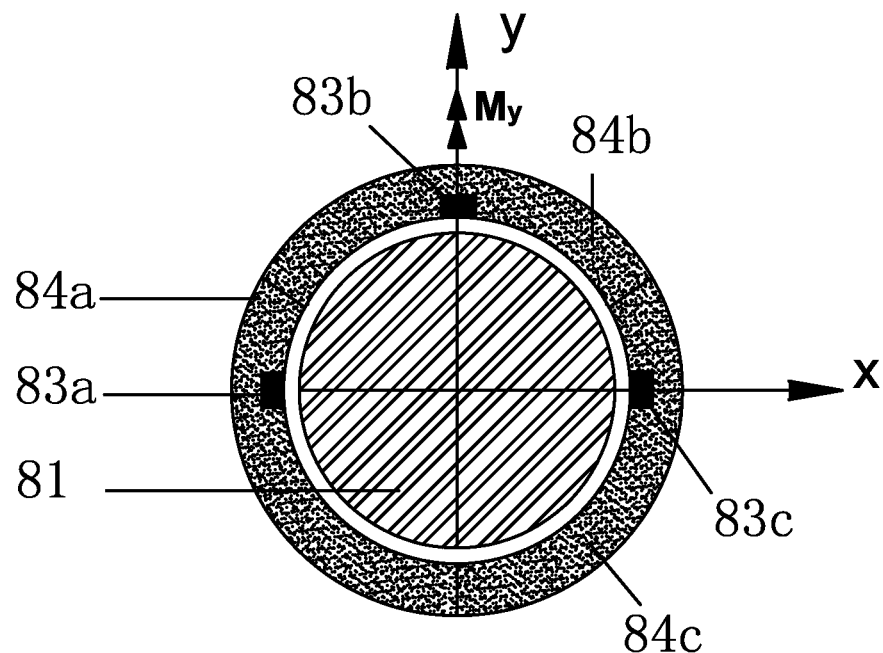
FIG. 11C is a transversal sectional diagram for the structure of FIG. 11A which monitors stress of a structural component under a one-way bending load $M_y$ around the Y axis.

FIGS. 11A, 11B, and 11C are respectively a schematic perspective diagram, and two cross-sectional diagrams for an exemplary structure of the device of FIGS. 3A, 3B, and 3C which monitors stress of a structural component under a bending load. The distribution of the magnetic flux lines, the arrangement of the ME sensing units 83a, 83b, and 83c, and the form of support skeleton segmentations 84a, 84b, and 84c are shown in the figure. FIG. 11A is a schematic perspective diagram for an exemplary structure of the device of FIGS. 3A, 3B, and 3C which monitors stress of a structural component under a one-way bending load $M_x$ around the X axis. FIG. 11B is a cross-sectional diagram for an exemplary structure of the device of FIGS. 3A, 3B, and 3C which monitors stress of a structural component under a one-way bending load $M_x$ around the X axis. FIG. 11C is a cross-sectional diagram for an exemplary structure of the device of FIGS. 3A, 3B, and 3C which monitors stress of a structural component under a one-way bending load $M_y$ around the Y axis. At least two or more ME sensing units under are needed for the case of one-way bending to obtain an idealized monitoring result.

Figure 12A:
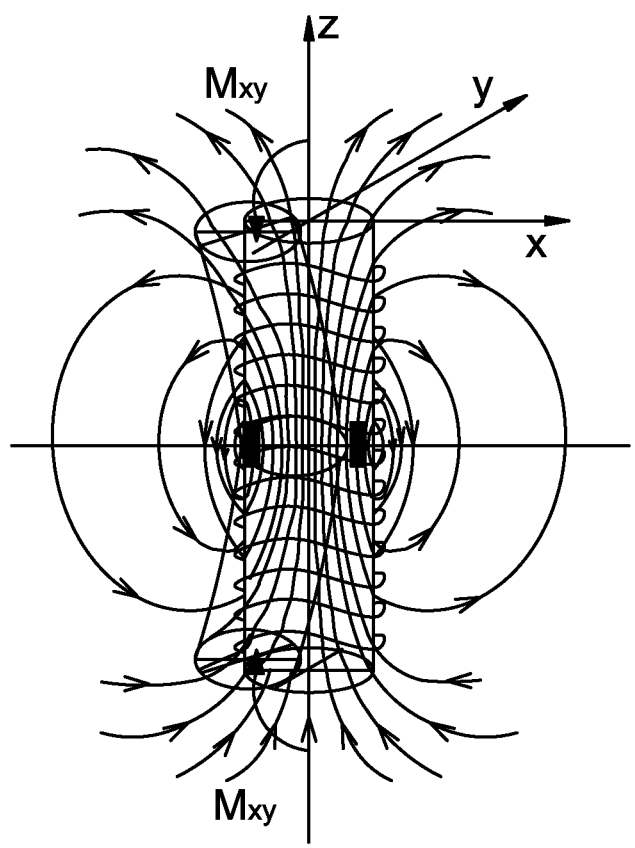
FIG. 12A is a schematic perspective diagram illustrating distribution of the magnetic flux lines, an arrangement of the ME sensing units, and an arrangement of the skeleton segmentations for an exemplary structure of the device of FIGS. 3A, 3B, and 3C which monitors stress of a structural component under a biaxial bending load, in accordance with one embodiment of the invention.
Figure 12B:
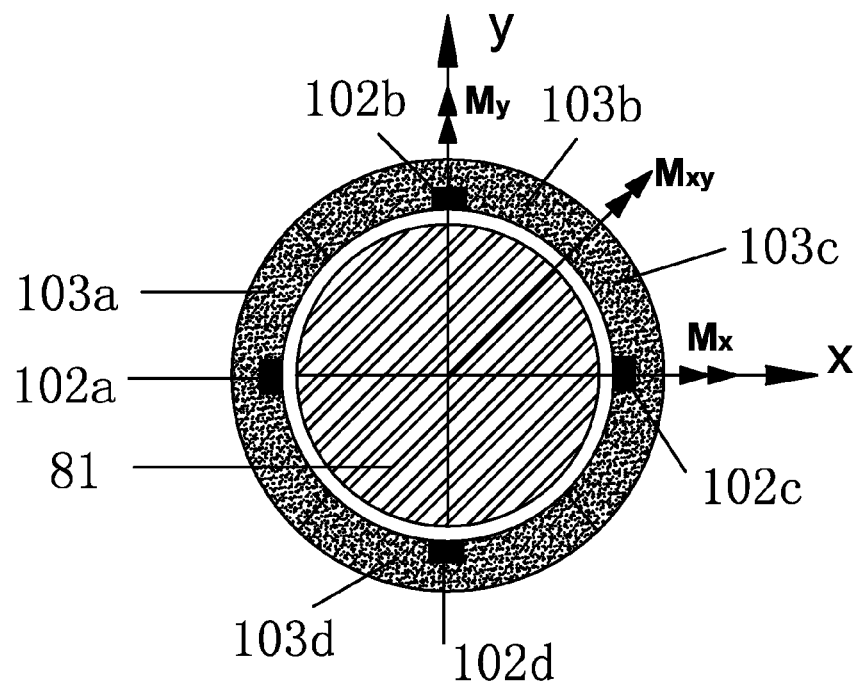
FIG. 12B is a transversal sectional diagram for the structure of FIG. 12A which monitors stress of a structural component under biaxial bending load $M_{xy}$ around the X axis and Y axis.

FIGS. 12A and 12B are respectively a schematic perspective diagram and a cross-sectional diagram for an exemplary structure of the device of FIGS. 3A, 3B, and 3C which monitors stress of a structural component under a bending load. The distribution of the magnetic flux lines, the arrangement of the ME sensing units 102a, 102b, 102c, and 102d and the form of support skeleton segmentations 103a, 103b, 103c, and 103d are shown in the figure. The structures of the figures are for the purpose of monitoring stress of a structural component under a biaxial bending moment $M_{XY}$ around both the X axis and Y axis. At least three or more ME sensing units under are needed for the case of one-way bending to obtain an idealized monitoring result.

Figure 13A:
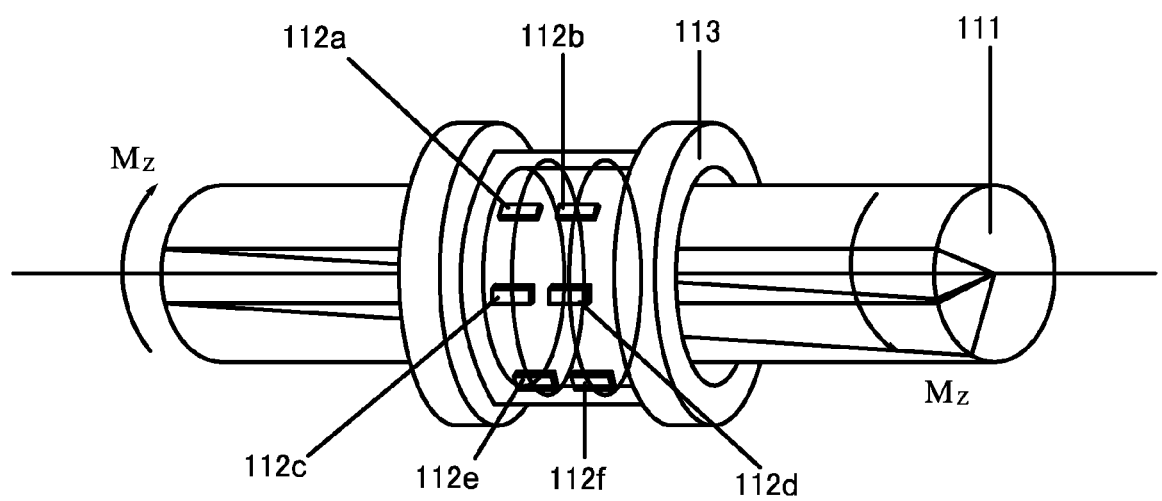
FIG. 13A is a schematic perspective diagram for an exemplary structure of the device of FIGS. 7A and 7B which monitors a structural component under a torque $M_z$ by displacing several rows of the ME sensing units in one magnetic coil and displacing one or more ME sensing units in each row of the ME sensing units (a E-MultiME type detection arrangement), in accordance with one embodiment of the invention.

FIG. 13A is a schematic perspective diagram for exemplary structure of the device of FIGS. 7A, 7B (the arrangement for detection between excitation coil and the ME sensing units is a E-MultiME type arrangement). As shown in the figure, multiple rows of the ME sensing units are arranged in one magnetic coil 113, and several ME sensing units (112a, 112c, and 112e) and (112b, 112d, and 112f) are arranged in each row, for the purpose of monitoring the stress distribution of the component 111 in torsion, wherein the load is a torque $M_Z$.

Figure 13B:
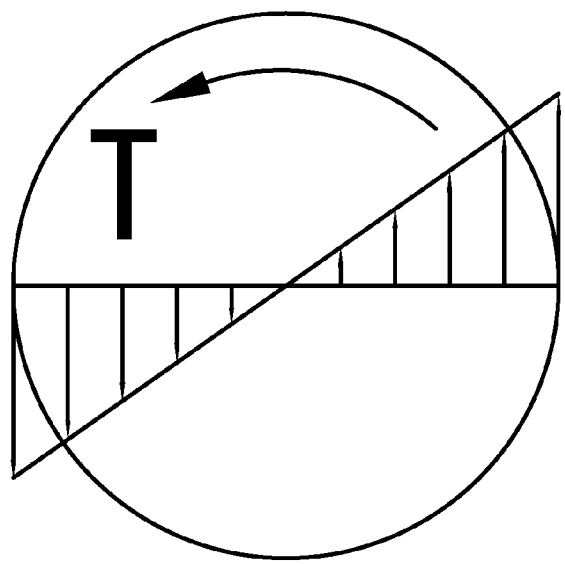
FIG. 13B is schematic diagram of the stress distribution of the structural component under a torque $M_z$ of FIG. 13A.

FIG. 13B is schematic diagram of the stress distribution of the structural component 111 under a torque $M_z$ of FIG. 13A.

Figure 13C:
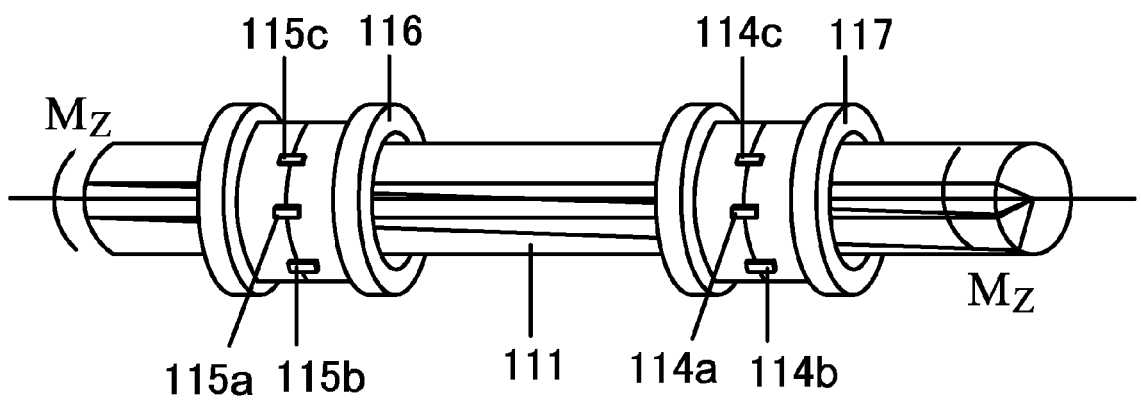
FIG. 13C is a schematic perspective diagram for an exemplary structure of the device of FIG. 9 which monitors a structural component under a torque $M_z$ by displacing one set of the magnetic field generating units combined with the ME sensing units around one of the multiple cross sections (a Multi-EME type detection arrangement), in accordance with one embodiment of the invention.

FIG. 13C is a schematic perspective diagram for exemplary structure of the device of FIG. 9 (the arrangement for detection between excitation coil and the ME sensing units is a Multi-EME type arrangement). As shown in the figure, an individual set of magnetic field generating unit (116 or 117) combined with several ME sensing units (114a, 114b, and 114c) or (115a, 115b, and 115c) is arranged for each of the multiple sections, to monitor the stress distribution of the component 111 in torsion, wherein the load is a torque $M_Z$.

Similarly, for the components subjected to other forms of forcing state, the arrangement of the ME sensing units and the segmentations of the support skeletons are determined by the forcing characteristic.

The conventional Magneto-Elastic cable force sensor can only monitor the component under uniaxial loading, mainly cable force. For the conventional Magneto-Elastic cable force sensor, since the secondary coil can only measure the change of the magnetic field in the whole windings area and the secondary coil is usually wound around the cylindrical support skeleton, the measured force is an average force inside the entire secondary coil. Therefore, the conventional Magneto-Elastic cable force sensor could not detect local stress or force on the component. Correspondingly, the conventional Magneto-Elastic cable force sensor is not applicable to detect stress of the non-cylindrical components, such as many types of cross-sections: circular cross-section, rectangular cross-section, L-type cross-section, and T-type cross-section. On contrast the stress monitoring device of EME effect type in the present invention is able to monitor the stress distribution and forcing state of the components having different shapes of cross sections by placing the ME sensing units in multiple locations around the cross sections. The ME sensing units are symmetrically placed for the components with symmetrical cross sections, and dispersedly and locally placed for the components of asymmetrical cross sections. In the present invention, the specific displacements of the elements in the stress monitoring device of EME effect type are determined according to the shapes of the cross section of the monitored components. In the invention, the locations and number of the ME sensing units are determined according to the shapes of the cross section of the specific component and the stress distribution of the component. Generally, the ME sensing units are placed at the locations of stress transition or the characteristic points of the stress distribution (e.g. the maximum stress point).

The following exemplary embodiments illustrate that multiple ME sensing units are used to monitor stress of the structural components having different shapes of cross sections.

Figure 14:
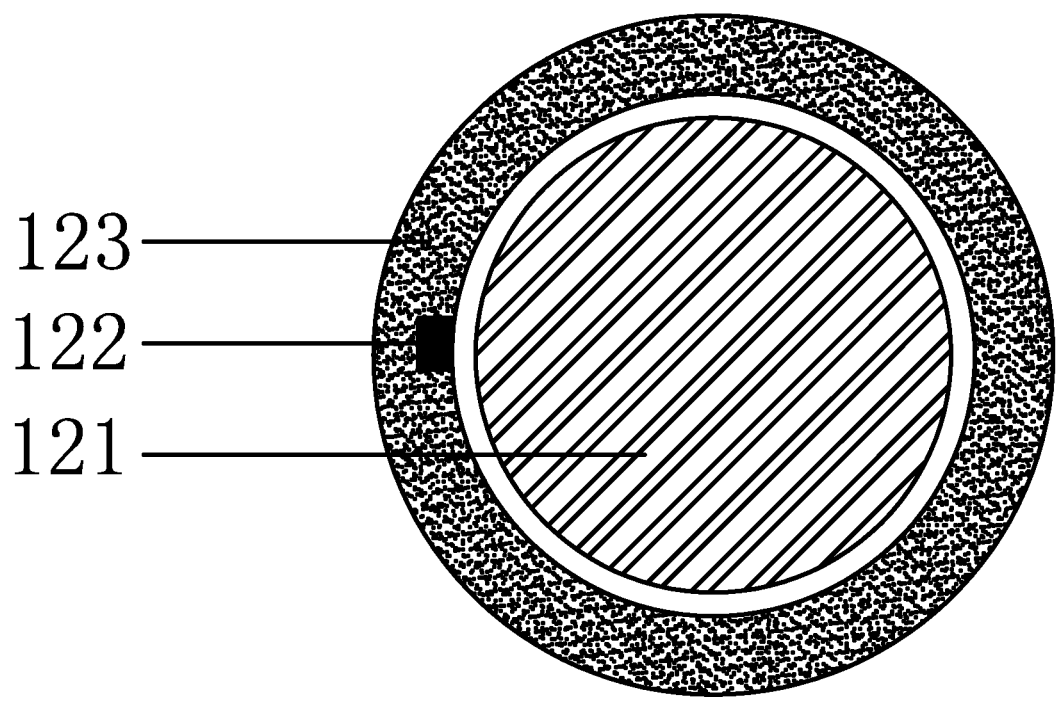
FIG. 14 is a transversal sectional diagram illustrating an arrangement of the ME sensing units and the support skeleton for an exemplary structure of the device of FIGS. 3A, 3B, and 3C which monitors stress of a structural component having a circular cross section, in accordance with one embodiment of the invention.

FIG. 14 shows a transversal sectional diagram for an exemplary structure of the device of FIGS. 3A, 3B, and 3C. The figure illustrates an arrangement of the ME sensing units and the support skeleton for detecting a circular cross-sectional structural component 121. An ME sensing unit 122 and a unitary support skeleton 123 are taken in this embodiment, nevertheless, multiple ME sensing units and multiple integrated support skeletons may be adopted.

Figure 15A:
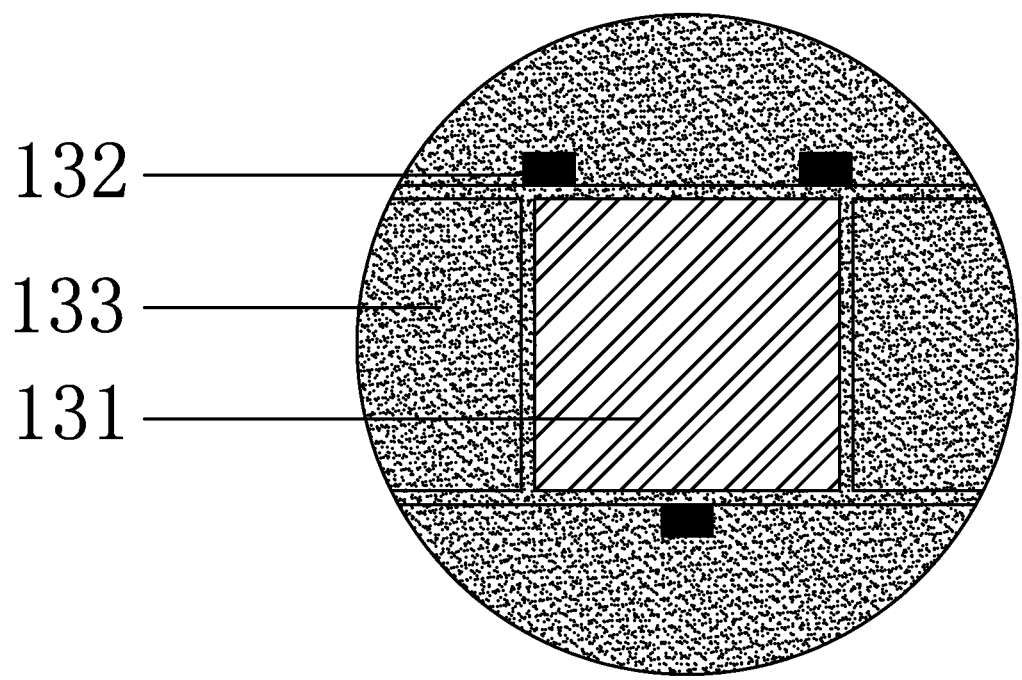
FIG. 15A is a transversal sectional diagram illustrating a first arrangement of the ME sensing units and the support skeleton for an exemplary structure of the device of FIGS. 3A, 3B, and 3C which monitors stress of a structural component having a rectangular cross section, in accordance with one embodiment of the invention.
Figure 15B:
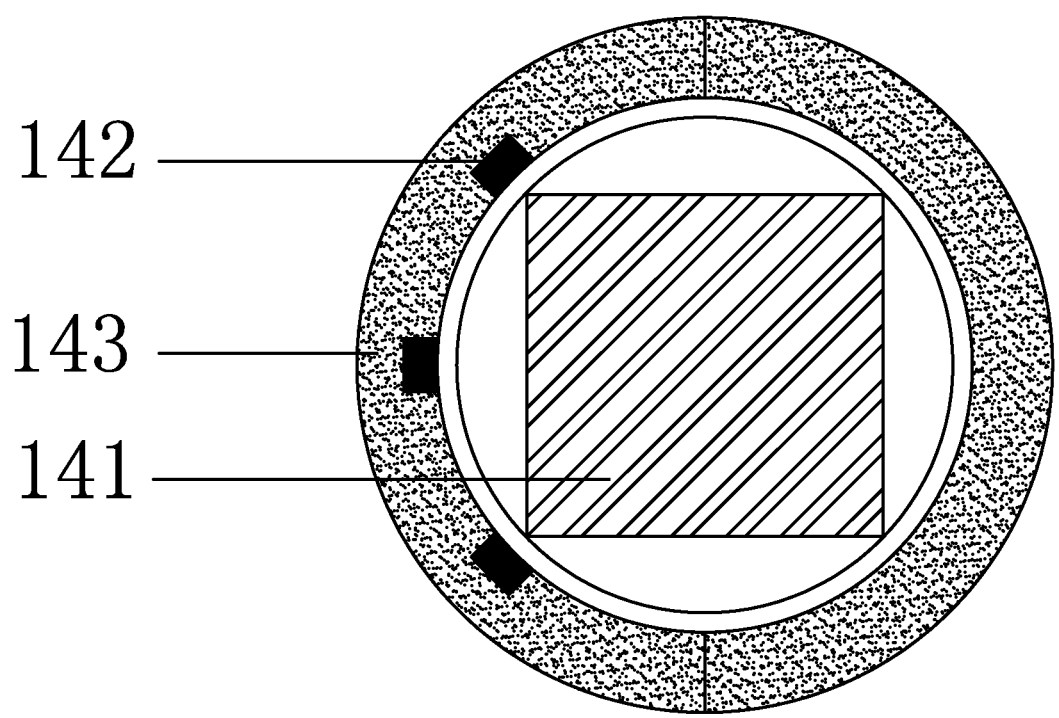
FIG. 15B is a transversal sectional diagram illustrating a second arrangement of the ME sensing units and the support skeleton for an exemplary structure of the device of FIGS. 3A, 3B, and 3C which monitors stress of a structural component having a rectangular cross section, in accordance with one embodiment of the invention.
Figure 15C:
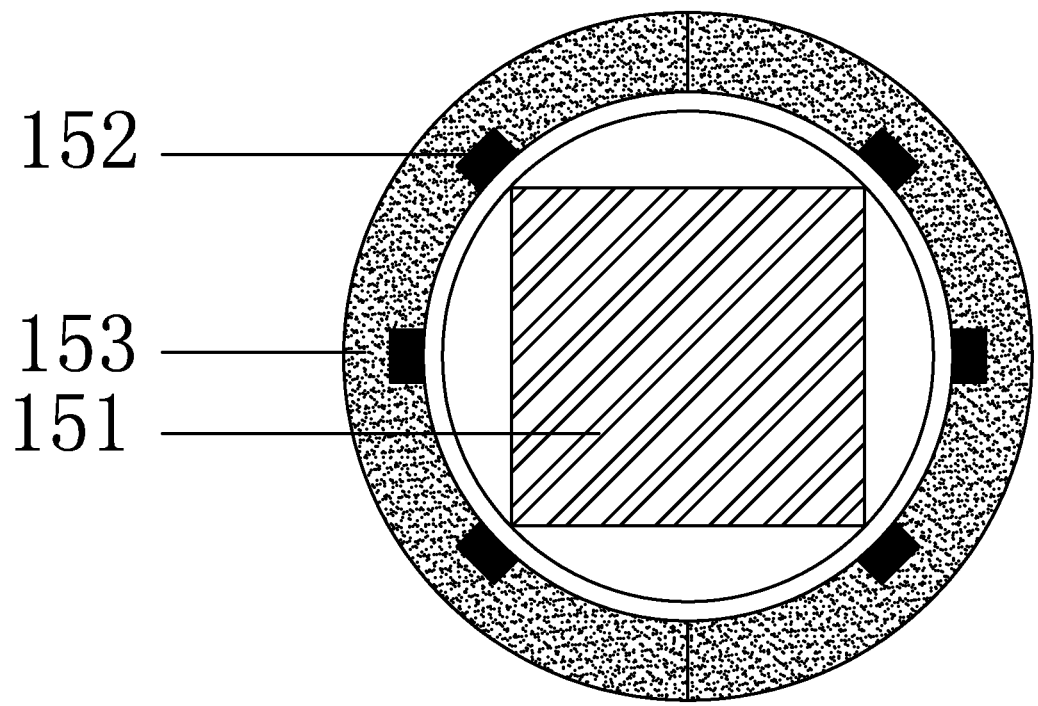
FIG. 15C is a transversal sectional diagram illustrating a third arrangement of the ME sensing units and the support skeleton for an exemplary structure of the device of FIGS. 3A, 3B, and 3C which monitors stress of a structural component having a rectangular cross section, in accordance with one embodiment of the invention.

FIGS. 15A, 15B, and 15C show a transversal sectional diagram for an exemplary structure of the device of FIGS. 3A, 3B, and 3C. The figure illustrates an arrangement of the ME sensing units 132, 142, and 152 and the support skeletons 133, 143, and 153 for detecting rectangular cross-sectional structural components 131, 141, and 151.

Figure 16A:
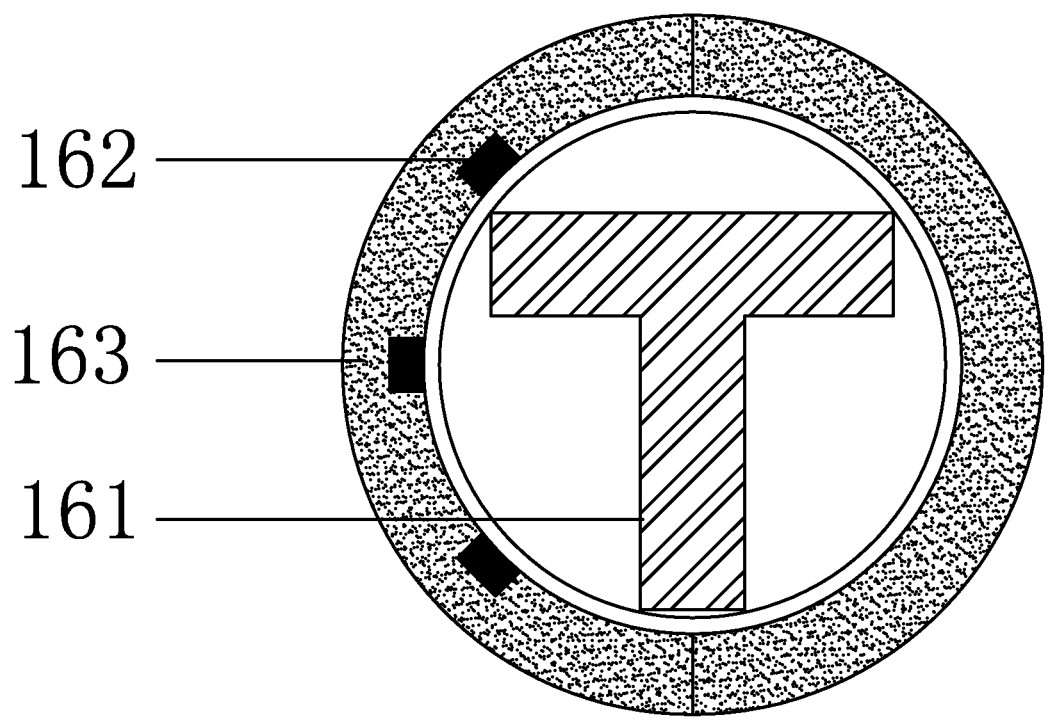
FIG. 16A is a transversal sectional diagram illustrating a first arrangement of the ME sensing units and the support skeleton for an exemplary structure of the device of FIGS. 3A, 3B, and 3C which monitors stress of a structural component having a T-type cross section, in accordance with one embodiment of the invention.
Figure 16B:
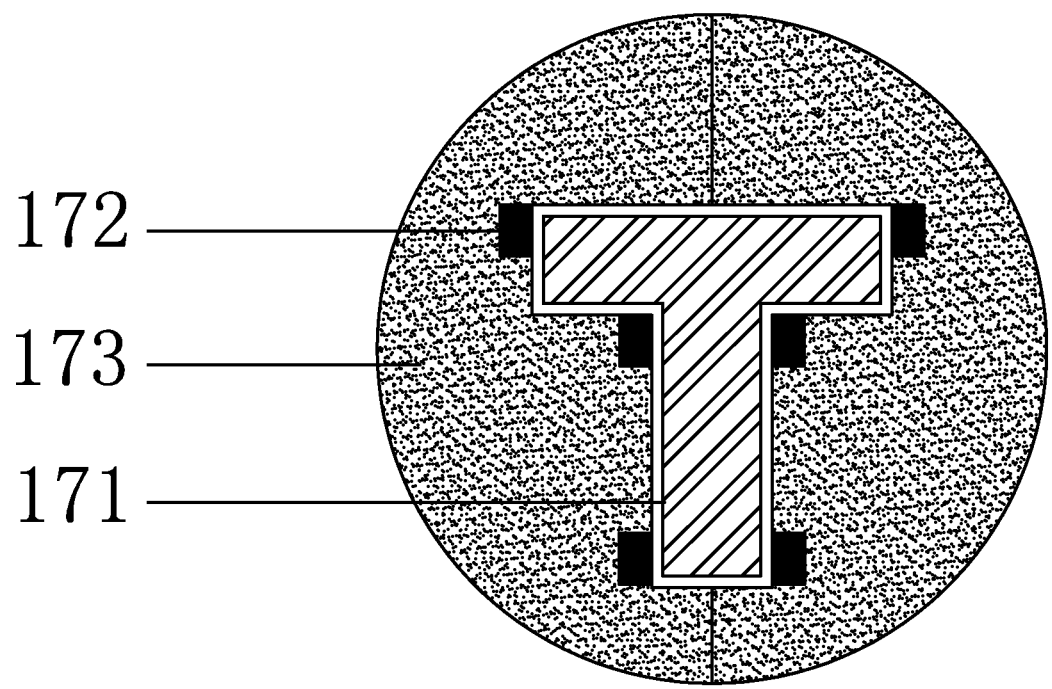
FIG. 16B is a transversal sectional diagram illustrating a second arrangement of the ME sensing units and the support skeleton for an exemplary structure of the device of FIGS. 3A, 3B, and 3C which monitors stress of a structural component having a T-type cross section, in accordance with one embodiment of the invention.
Figure 16C:
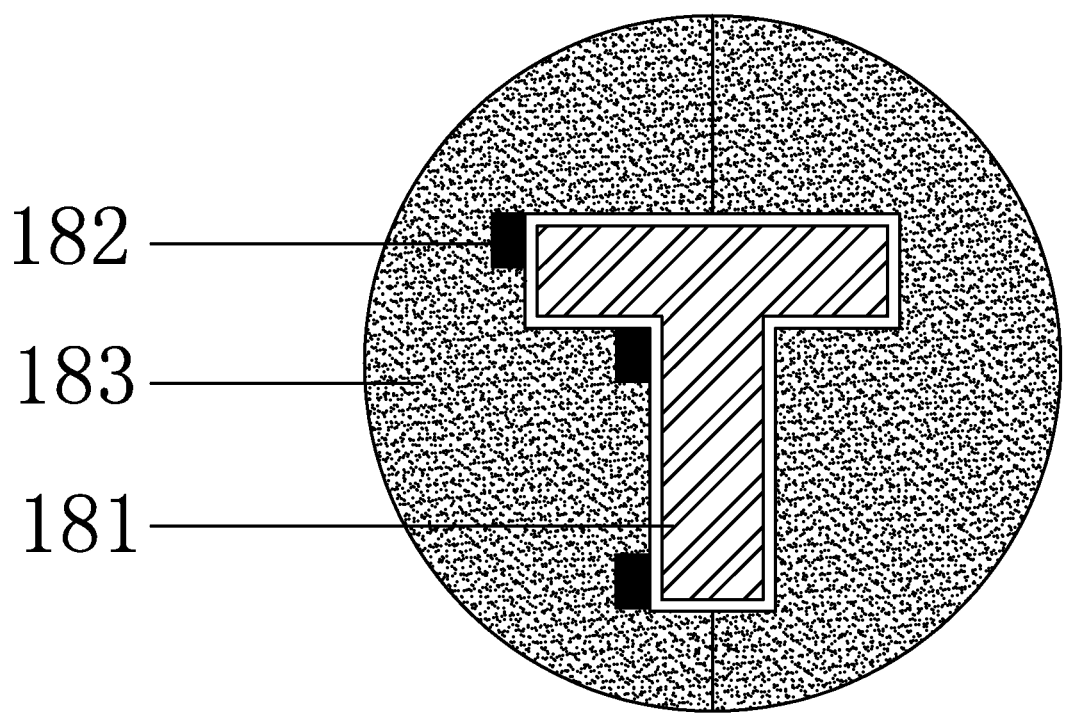
FIG. 16C is a transversal sectional diagram illustrating a third arrangement of the ME sensing units and the support skeleton for an exemplary structure of the device of FIGS. 3A, 3B, and 3C which monitors stress of a structural component having a T-type cross section, in accordance with one embodiment of the invention.

FIGS. 16A, 16B, and 16C show a transversal sectional diagram for an exemplary structure of the device of FIGS. 3A, 3B, and 3C. The figure illustrates an arrangement of the ME sensing units 162, 172, and 182 and the support skeletons 163, 173, and 183 for detecting rectangular cross-sectional structural components 161, 171, and 181.

Figure 17:
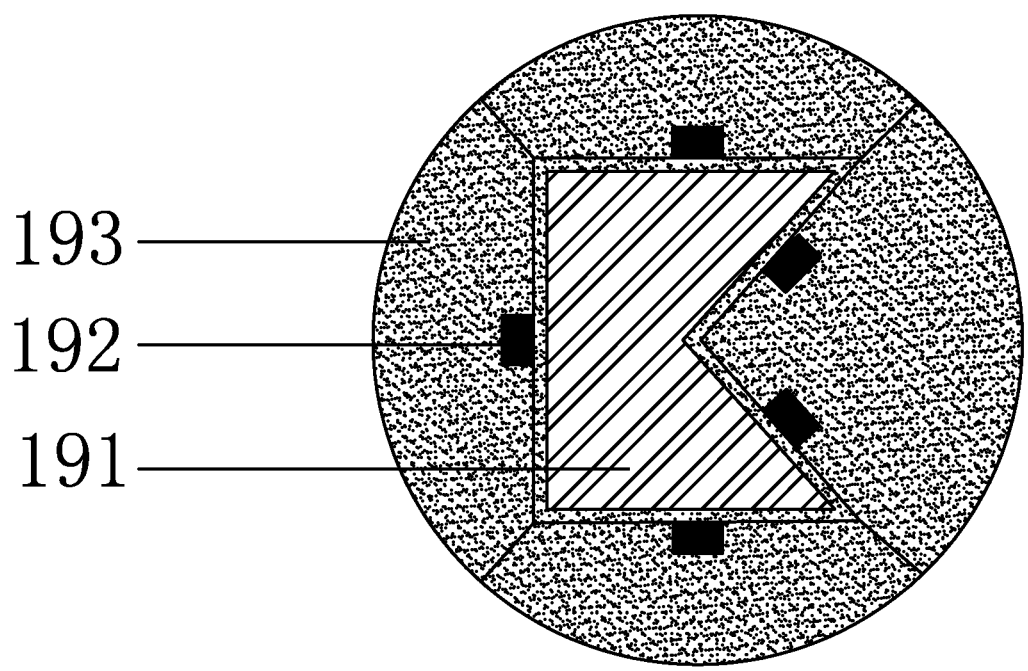
FIG. 17 is a transversal sectional diagram illustrating an arrangement of the ME sensing units and the support skeleton for an exemplary structure of the device of FIGS. 3A, 3B, and 3C which monitors stress of a structural component having an irregular cross section, in accordance with one embodiment of the invention.

FIG. 17 shows a transversal sectional diagram for an exemplary structure of the device of FIGS. 3A, 3B, and 3C. The figure illustrates an arrangement of the ME sensing units 192 and the form of support skeleton segmentations 193 for detecting irregular cross-sectional structural component 191.

The following exemplary embodiments illustrate the relative installation positions of the multiple ME sensing units and the support skeletons.

Figure 18A:
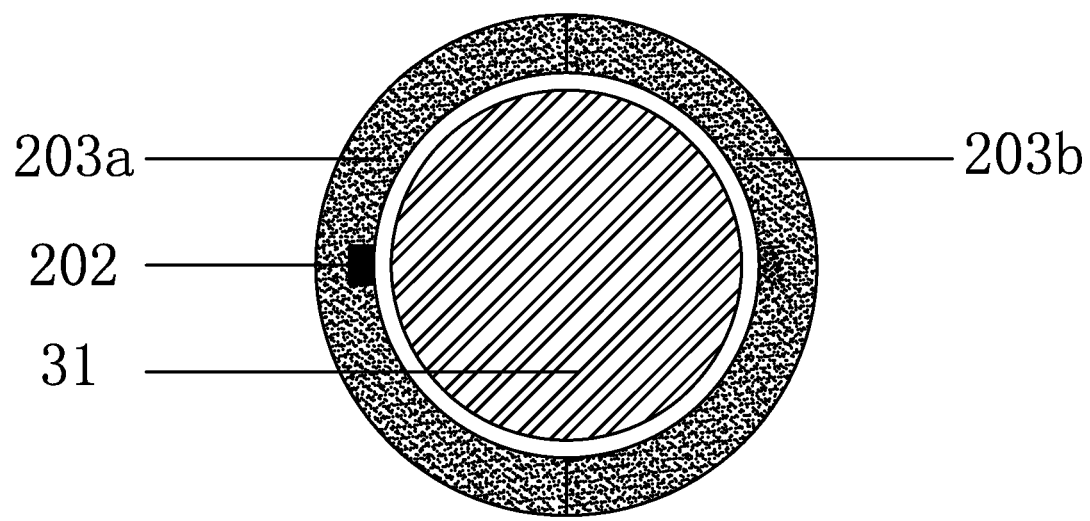
FIG. 18A is a transversal sectional diagram illustrating a first relative arrangement between the ME sensing units and the support skeleton for an exemplary structure of the device of FIGS. 3A, 3B, and 3C, in accordance with one embodiment of the invention.

FIG. 18A shows the first exemplary arrangement for the relative installation positions of the ME sensing unit and support skeleton of the device of FIGS. 3A, 3B, and 3C. The figure shows that the ME sensing unit 202 is placed inside of the support skeletons 203a, 203b.

Figure 18B:
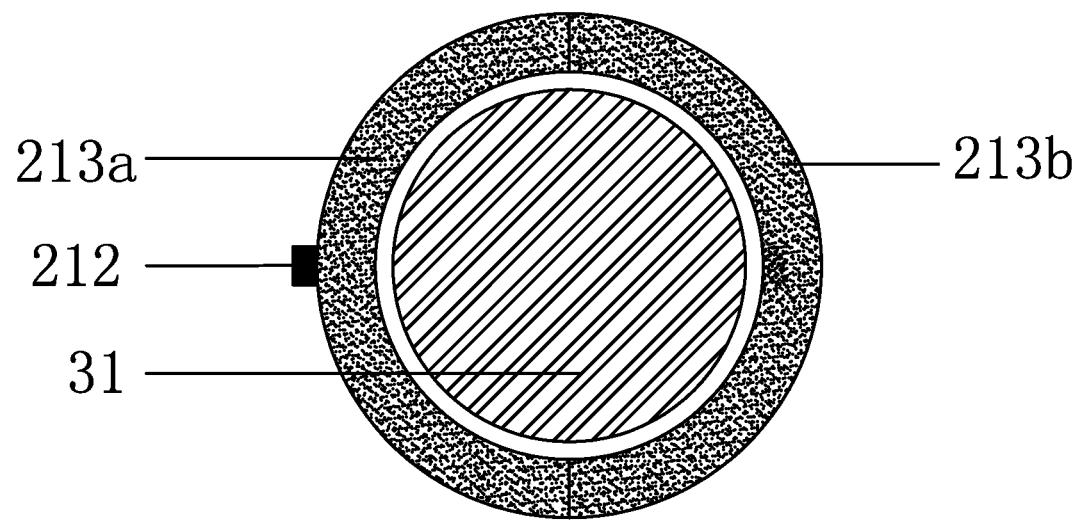
FIG. 18B is a transversal sectional diagram illustrating a second relative arrangement between the ME sensing units and the support skeleton for an exemplary structure of the device of FIGS. 3A, 3B, and 3C in accordance with one embodiment of the invention.

FIG. 18B shows the second exemplary arrangement for the relative installation positions of the ME sensing unit and support skeleton of the device of FIGS. 3A, 3B, and 3C. The figure shows that the ME sensing unit 212 is placed outside of the support skeletons 213a, 213b, and specially, on the outer surface of the support skeletons 213a, 213b.

Figure 18C:
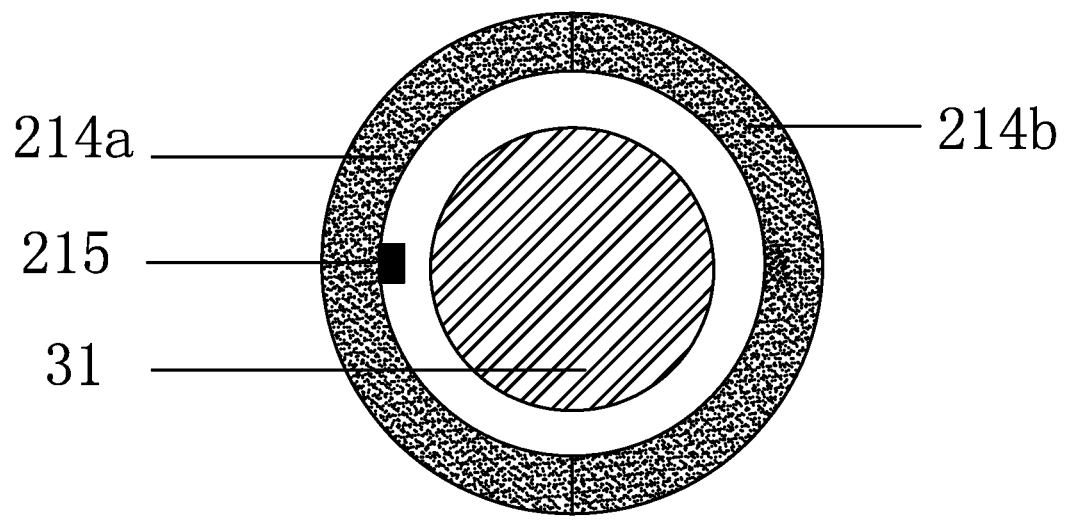
FIG. 18C is a transversal sectional diagram illustrating a third relative arrangement between the ME sensing units and the support skeleton for an exemplary structure of the device of FIGS. 3A, 3B, and 3C, in accordance with one embodiment of the invention.

FIG. 18C shows the third exemplary arrangement for the relative installation positions of the ME sensing unit and support skeleton of the device of FIGS. 3A, 3B, and 3C. The figure shows that the ME sensing unit 215 is placed outside of the support skeletons 214a, 214b, and specially, on the inner surface of the support skeletons 214a, 214b.

Figure 18D:
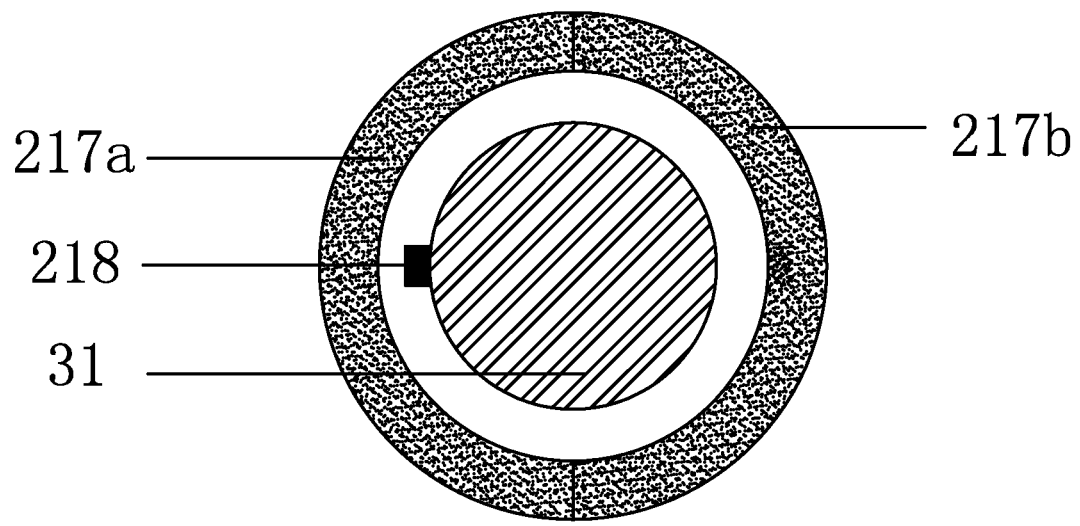
FIG. 18D is a transversal sectional diagram illustrating a fourth relative arrangement between the ME sensing units and the support skeleton for an exemplary structure of the device of FIGS. 3A, 3B, and 3C, in accordance with one embodiment of the invention.

FIG. 18D shows the fourth exemplary arrangement for the relative installation positions of the ME sensing unit and support skeleton of the device of FIGS. 3A, 3B, and 3C. The figure shows that the ME sensing unit 218 is placed outside of the support skeletons 217a, 217b, and specially, on the surface of the monitored component 31.

Figure 19A:
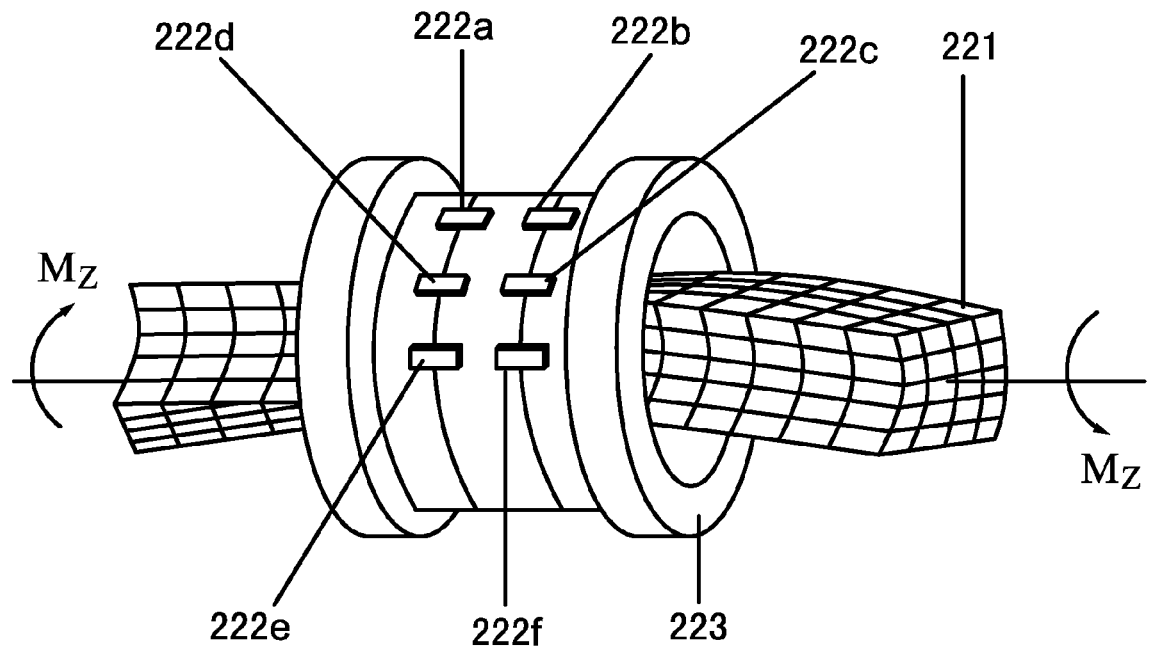
FIG. 19A is a schematic perspective diagram illustrating a first arrangement of the ME sensing units in a structure having E-MultiME type arrangement between the ME sensing units and the magnetic field generating units for an exemplary structure of the device of FIG. 13A which monitors stress of a structural component having a rectangular cross section, in accordance with one embodiment of the invention.
Figure 19B:
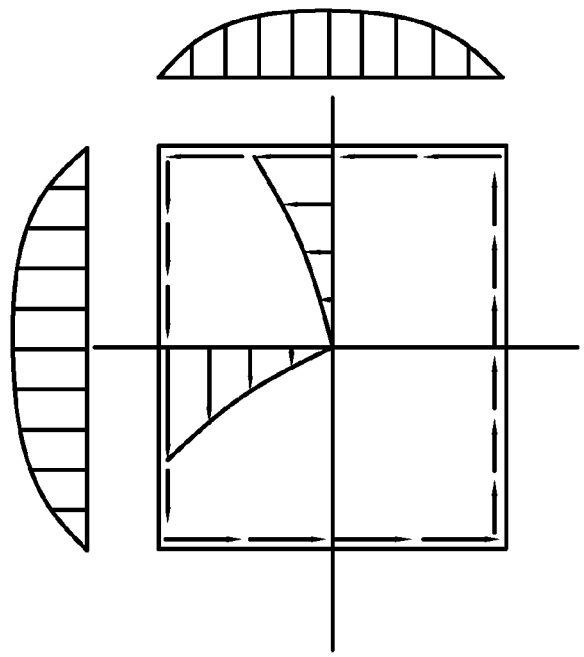
FIG. 19B is schematic diagram of the stress distribution in the structural component under a torque $M_z$ of FIG. 19A.

FIG. 19A shows an exemplary arrangement of the ME sensing units in a structure having E-MultiME type arrangement between the ME sensing units and the magnetic field generating units of the device of FIG. 13A. As shown in FIG. 19A, the component 221 has a rectangular cross section, and the ME sensing units 222a, 222b, 222c, 222d, 222e, 222f are placed outside of the support skeleton 223. FIG. 19B shows the stress distribution of the monitored rectangular cross-sectional component 221 of FIG. 19A which is subjected to a torque $M_Z$.

Figure 19C:
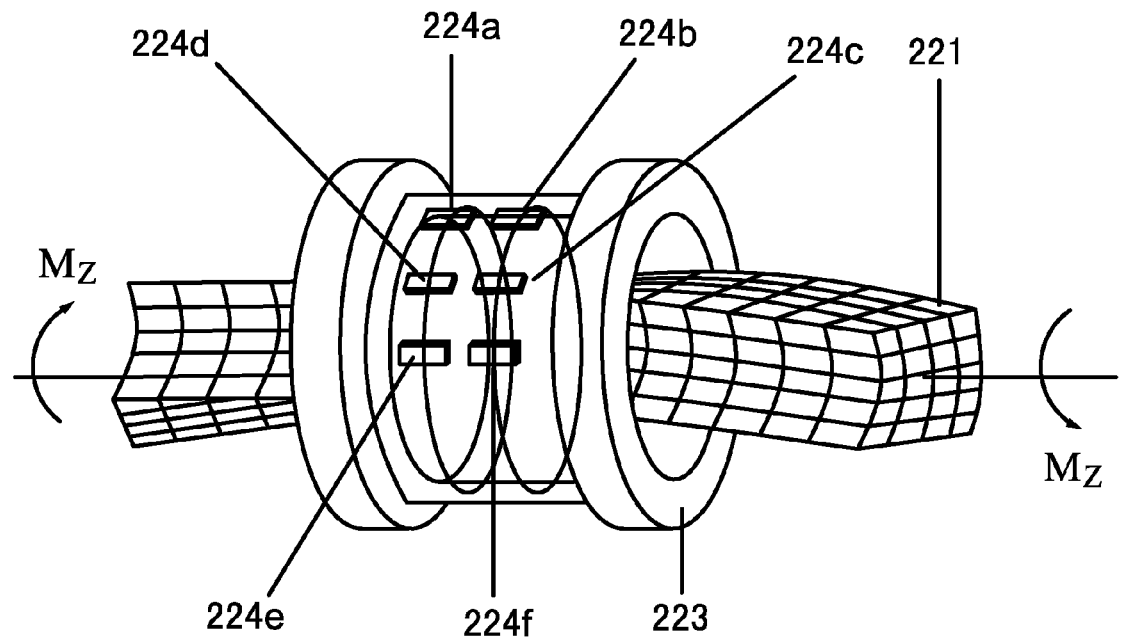
FIG. 19C is a schematic perspective diagram illustrating a second arrangement of the ME sensing units in a structure having E-MultiME type arrangement between the ME sensing units and the magnetic field generating units for an exemplary structure of the device of FIG. 13A which monitors stress of a structural component having a rectangular cross section, in accordance with one embodiment of the invention.
Figure 19D:
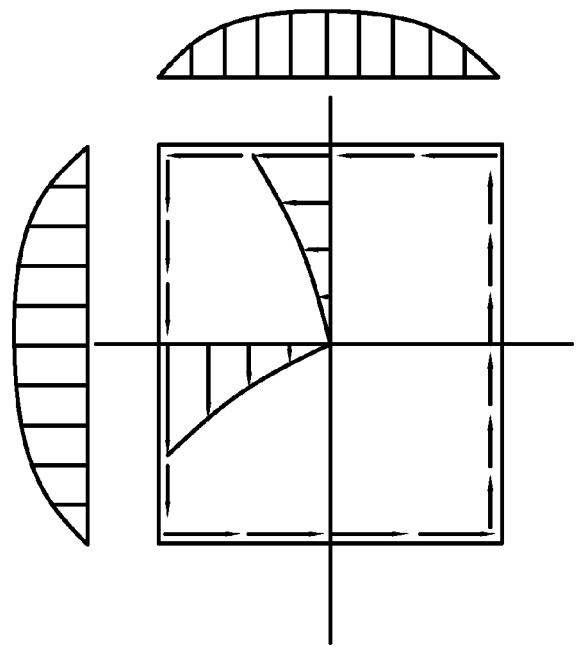
FIG. 19D is schematic diagram of the stress distribution in the structural component under a torque $M_z$ of FIG. 19C.

FIG. 19C shows another exemplary arrangement of the ME sensing units in a structure having E-MultiME type arrangement between the ME sensing units and the magnetic field generating units of the device of FIG. 13A. As shown in FIG. 19A, the component 221 has a rectangular cross section, and the ME sensing units 224a, 224b, 224c, 224d, 224e, 224f are placed outside of the support skeleton 223. FIG. 19D shows the stress distribution of the monitored rectangular cross-sectional component 221 of FIG. 19C which is subjected to a torque $M_Z$.

Figure 20A:
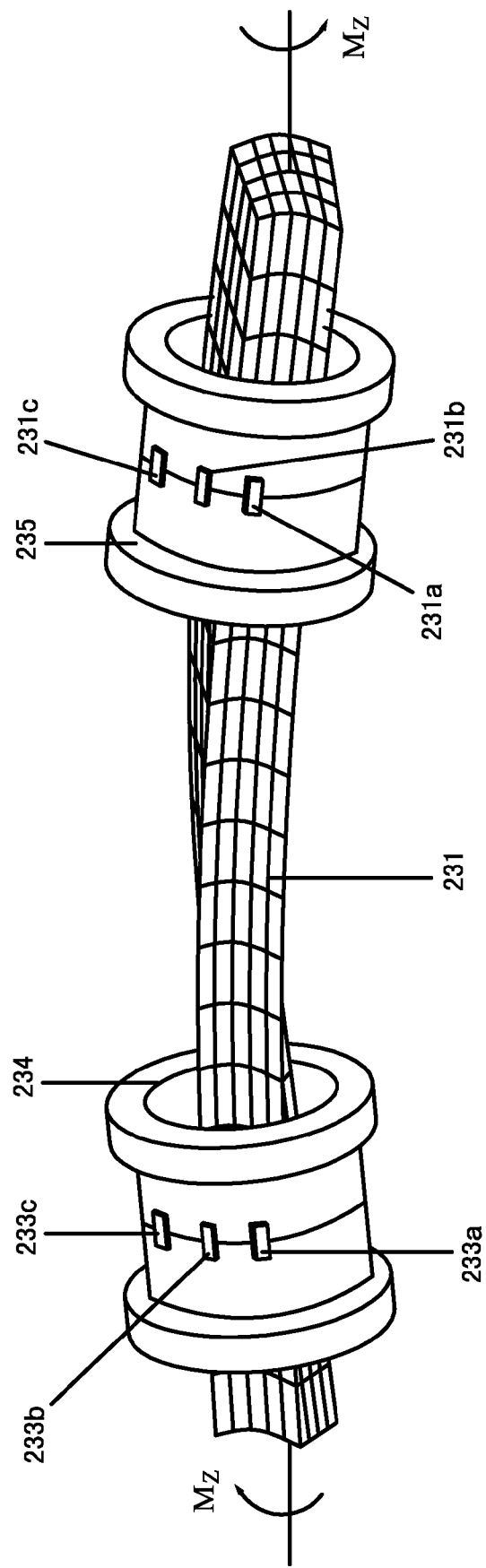
FIG. 20A is a schematic perspective diagram illustrating a first arrangement of the ME sensing units in a structure having Multi-EME type arrangement between the ME sensing units and the magnetic field generating units for an exemplary structure of the device of FIG. 13C which monitors stress of a structural component having a rectangular cross section, in accordance with one embodiment of the invention.

FIG. 20A shows a first arrangement of the ME sensing units in a structure having Multi-EME type arrangement between the ME sensing units and the magnetic field generating units for an exemplary structure of the device of FIG. 13C. As shown in FIG. 20A, the component 231 has a rectangular cross section, and the ME sensing units 233a, 233b, 233c, 231a, 231b, 231c are placed outside of the support skeleton 234, 235.

Figure 20B:
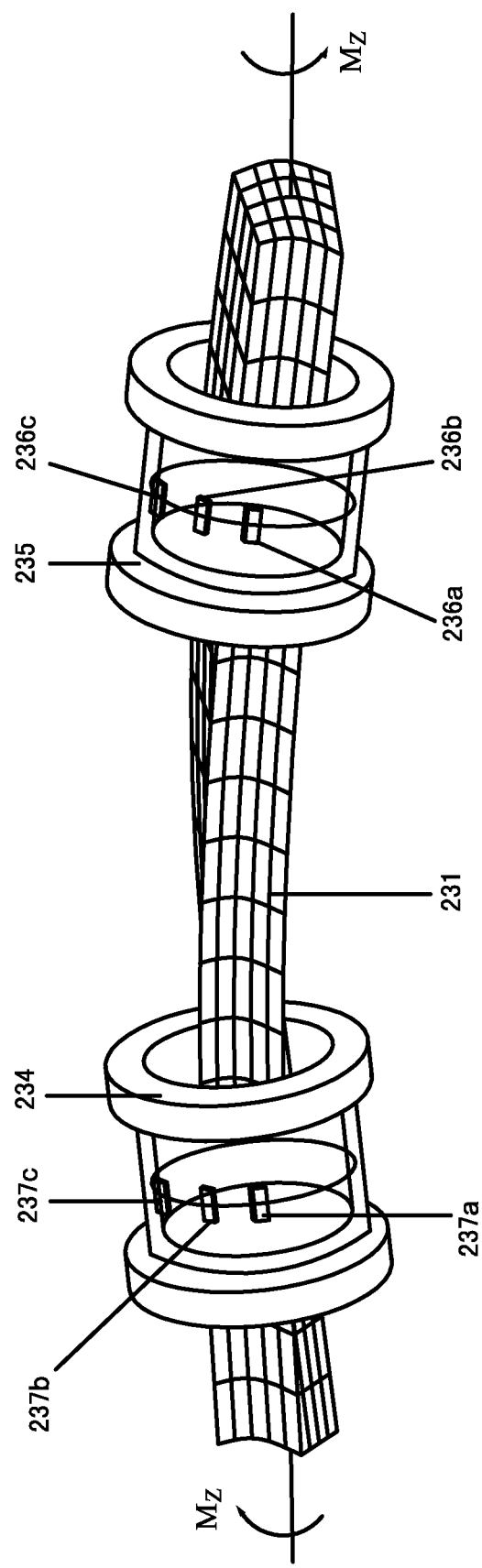
FIG. 20B is a schematic perspective diagram illustrating a second arrangement of the ME sensing units in a structure having Multi-EME type arrangement between the ME sensing units and the magnetic field generating units for an exemplary structure of the device of FIG. 13C which monitors stress of a structural component having a rectangular cross section, in accordance with one embodiment of the invention.

FIG. 20B shows a second arrangement of the ME sensing units in a structure having Multi-EME type arrangement between the ME sensing units and the magnetic field generating units for an exemplary structure of the device of FIG. 13C. As shown in FIG. 20B, the component 231 has a rectangular cross section, and the ME sensing units 237a, 237b, 237c, 236a, 236b, 236c are placed inside of the support skeleton 234, 235.

Figure 21A:
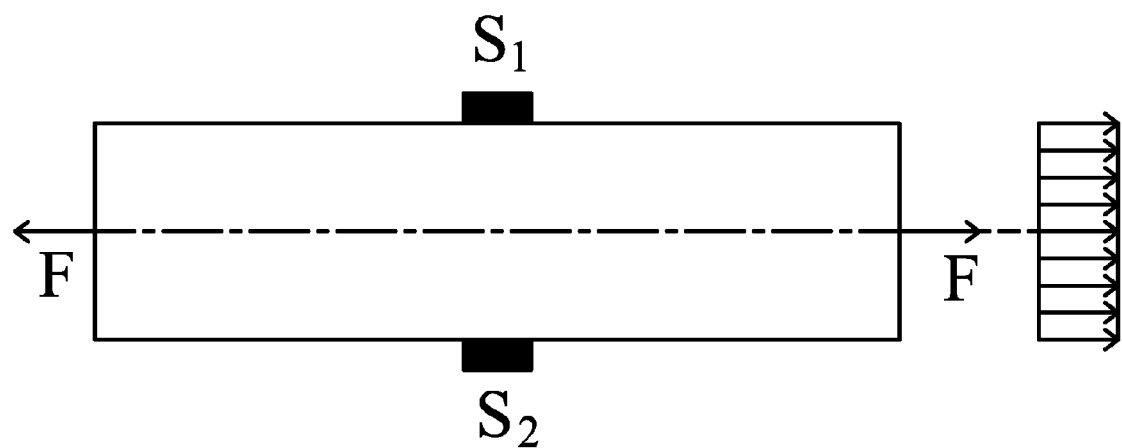
FIG. 21A is schematic diagram of structures for applying two ME sensing units to detect stress of a structural component under a uniaxial loading, in accordance with one embodiment of the invention.
Figure 21B:
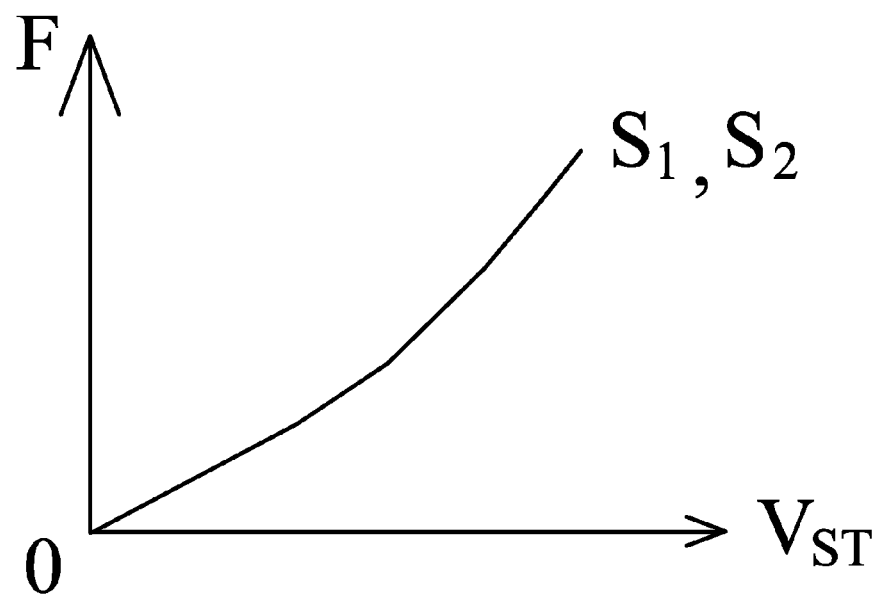
FIG. 21B is the test result of FIG. 21A illustrating the relationship between the external force F and the magnetic characteristic value $V_{st}$ for the structural component.

FIG. 21A shows structures by using the stress monitoring device of EME effect type of the invention to detect stress of a structural component under a uniaxial force F. Two ME sensing units S1 and S2 are applied to detect stress of the component. FIG. 21B is the test result of FIG. 21A illustrating the relationships between the external force F and the magnetic characteristic value $V_{st}$ corresponding to the two ME sensing units S1 and S2 for the structural component. Because the forcing state is uniform for the monitored cross sections, the results obtained from the electrical signals that are output from the two ME sensing units $S_1$ and $S_2$ and processed by the signal controlling and conditioning instrument are the same, the relationships between the external force F and magnetic characteristic value $V_{st}$ with respect to the two ME sensing units $S_1$ and $S_2$ are monotonous. The relation curve between the external force F and magnetic characteristic value $V_{st}$ when the component is subjected to a uniaxial loading may be linear, piecewise linear, or nonlinear. In practical application, the detected stress is determined by the calibrated curve or calibrated table and the magnetic characteristic values $V_{st}$ corresponding to the two ME sensing units S1 and S2.

Figure 21C:
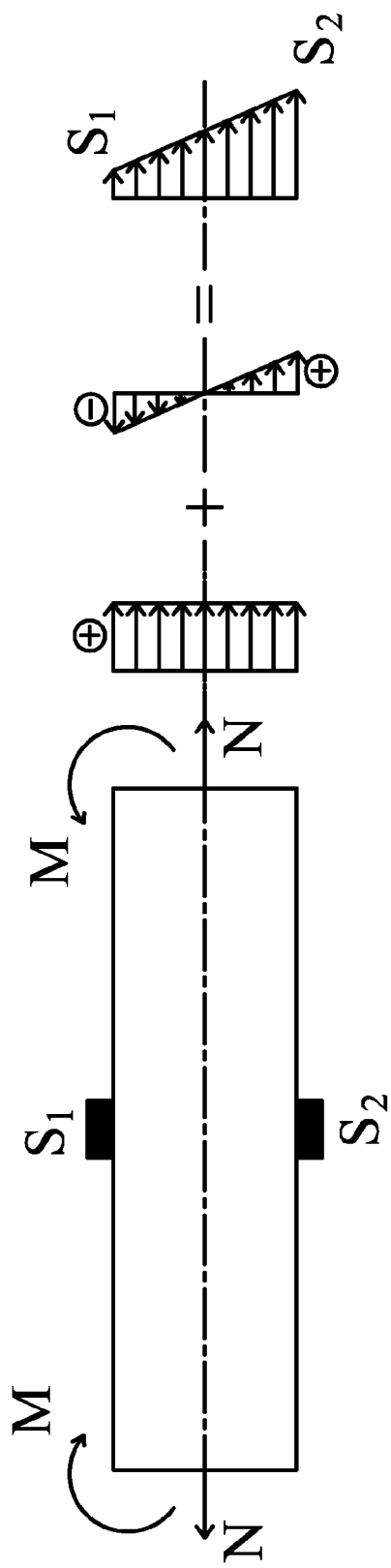
FIG. 21C is schematic diagram of structures for applying two ME sensing units to detect stress of a structural component under an axial force N and a bending moment M, in accordance with one embodiment of the invention.
Figure 21D:
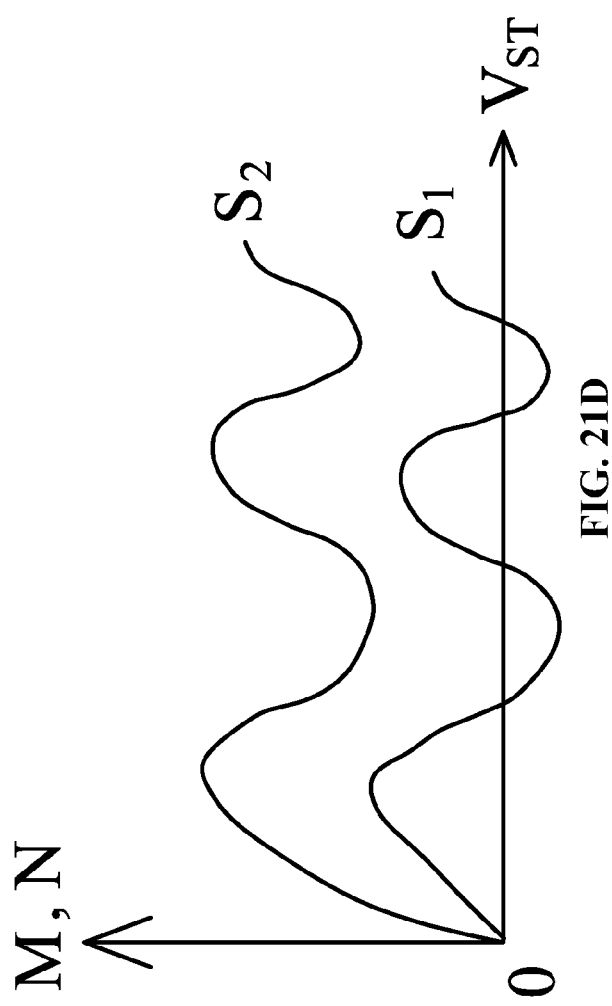
FIG. 21D is the test result of FIG. 21C illustrating the relationship between the external forces (M and N) and the magnetic characteristic value $V_{st}$ for the structural component.

FIG. 21C shows structures by using the stress monitoring device of EME effect type of the invention to detect stress of a structural component under a bending force M and a axial force N. Two ME sensing units S1 and S2 are applied to detect stress of the component. FIG. 21D is the test result of FIG. 21C illustrating the relationships between the external force M or N and the magnetic characteristic value $V_{st}$ for the structural component. Because the detected cross sections are stressed unevenly, the results obtained from the electrical signals that are output from the two ME sensing units $S_1$, and $S_2$ and processed by the signal controlling and conditioning instrument are different. The forcing state of the component, including the bending moment M and axial force N are determined by the calibrated data and the corresponding magnetic characteristic values $V_{st}$ of the two ME sensing units $S_1$ and $S_2$.

In addition, the magnetic field generating unit, the ME sensing unit, the signal controlling and conditioning instrument, and the support skeletons, each or all or the whole combination thereof in the present invention may be covered with or without a protection cover. The protection cover (the element 35 as shown in FIG. 3C) is not only able to screen out the external magnetic field to reduce interference between the external magnetic field and the internal magnetic field and signals of the device, but also able to protect the covered element from external damage and correspondingly prolong the service life of the device.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A stress monitoring device of elasto-magneto-electric (EME) effect type, for monitoring stress on arbitrary cross-sections of a ferromagnetic component in a real-time way, the device comprising:
   one or more magnetic field generating units;
   one or more magneto-electric (ME) sensing units;
   one or more support skeletons; and
   a signal controlling and conditioning instrument comprising a drive circuit and a data acquisition and processing device;
   wherein:
   said ferromagnetic component is subjected to tension, compression, bending, torsion, or a combination thereof;
   said arbitrary cross-sections have arbitrary shapes;
   said one or more magnetic field generating units are adapted to generate a magnetic field in a detected area around the ferromagnetic component, wherein the ferromagnetic component is magnetized by the magnetic field;
   said one or more support skeletons are used to set up said one or more magnetic field generating units and fix said one or more ME sensing units;
   said one or more ME sensing units are disposed in one or more locations near the arbitrary cross-sections;
   said one or more ME sensing units comprise ME laminated composites;
   said one or more ME sensing units are adapted to sense said magnetic field and to produce an electrical signal $V_{ME}$ in response to said magnetic field, wherein said electrical signal $V_{ME}$ corresponds to an intensity of said magnetic field at said one or more locations;
   said drive circuit is connected to said one or more magnetic field generating units and controls said one or more magnetic field generating units to generate said magnetic field; and
   said one or more ME sensing units are connected to said data acquisition and processing device, wherein said one or more ME sensing units send said electrical signal $V_{ME}$ to said data acquisition and processing device, and said data acquisition and processing device receives said electrical signal $V_{ME}$ and processes said electrical signal $V_{ME}$ to obtain a magnetic characteristic value $V_{st}$ after signal conditioning, wherein said magnetic characteristic value $V_{st}$ is corresponding to the value of the stress.

2. The device of claim 1, wherein said one or more magnetic field generating units are chosen from: (a) excitation coils; (b) permanent magnets; and (c) the combination of the excitation coils and the permanent magnets; and the chosen number of the excitation coils or permanent magnets is one or more.

3. The device of claim 2, wherein a source signal of said excitation coils is an AC signal or pulse signal.

4. The device of claim 1, wherein
   said one or more locations are disposed either on said one or more support skeletons or on a surface of the ferromagnetic component;
   said one or more locations are determined according to the distribution of said magnetic field, the stress state, the loading conditions, and cross-section shapes of said ferromagnetic component;
   each of said one or more locations is corresponding to each of said one or more ME sensing units.

5. The device of claim 4, wherein said one or more locations are positions where magnetic intensity in said magnetic field is most sensitive to the stress.

6. The device of claim 1, wherein said one or more locations are disposed either on said one or more support skeletons or on a surface of the ferromagnetic component at a position corresponding to the arbitrary cross-sections.

7. The device of claim 1, wherein said one or more ME sensing units are disposed inside or outside of said one or more support skeletons; said outside of said one or more support skeletons comprises inner or outer surfaces of said one or more support skeletons and surfaces of the ferromagnetic component.

8. The device of claim 1, wherein said one or more support skeletons are unitary bodies or assembled bodies of several pieces.

9. The device of claim 1, wherein the device further comprises a protective cover, said protective cover is disposed to cover one or more of said one or more magnetic field generating units, said one or more ME sensing units, said one or more support skeletons unit, and said signal controlling and conditioning instrument, or the whole device; said protective cover is to screen out the external magnetic field and to reduce interference between the external magnetic field and the internal magnetic field and signals of the device, as well as to protect the covered elements from external damage and correspondingly prolong the service life of the device.

* * * * *